(12) United States Patent
Sakazume

(10) Patent No.: US 8,090,025 B2
(45) Date of Patent: Jan. 3, 2012

(54) MOVING-PICTURE CODING APPARATUS, METHOD AND PROGRAM, AND MOVING-PICTURE DECODING APPARATUS, METHOD AND PROGRAM

(75) Inventor: Satoru Sakazume, Kanagawa-Ken (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 1294 days.

(21) Appl. No.: 11/787,623

(22) Filed: Apr. 17, 2007

(65) Prior Publication Data

US 2007/0268968 A1 Nov. 22, 2007

(30) Foreign Application Priority Data

Apr. 17, 2006 (JP) .................................. 2006-112995
Mar. 30, 2007 (JP) .................................. 2007-093162

(51) Int. Cl.
*H04N 7/12* (2006.01)
*H04N 11/04* (2006.01)

(52) U.S. Cl. ......... 375/240.16; 375/240.12; 375/240.13; 375/240.22; 375/240.23; 375/240.14; 375/240.01; 375/240; 382/238; 382/232; 348/394.1; 348/393.1; 348/384.1; 348/409.1; 348/410.1; 348/411.1; 348/415.1

(58) Field of Classification Search .................. None
See application file for complete search history.

(56) References Cited

U.S. PATENT DOCUMENTS 5,649,030 A * 7/1997 Normile et al. ............... 382/253

(Continued)

FOREIGN PATENT DOCUMENTS

WO WO 03/003749 1/2003

OTHER PUBLICATIONS

Non-patent document "Improvement of DCT-based Compression Algorithms Using Poisson's Equation," Katsu Yamatani and Naoki Saito, Senior Member, IEEE, pp. 1-36, Sep. 12, 2005.

*Primary Examiner* — Syed A. Zia
(74) *Attorney, Agent, or Firm* — Renner, Kenner, Greive, Bobak, Taylor & Weber

(57) ABSTRACT

A residual picture is produced and encoded that is a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided. A boundary condition of each of a plurality of borders is obtained between the rectangular zones and another plurality of rectangular zones adjacent to the rectangular zones, and a border, of the reference picture, having a boundary condition that matches the boundary condition, is found by motion-vector search in the reference picture, and border motion-vector data is generated that is data on a motion vector from a border of the rectangular zone in the picture to be coded to the border of the reference picture thus found. A boundary condition of a border that corresponds to the border motion vector data is defined from the reference picture based on the border motion-vector data, and an estimated video signal is generated in each rectangular zone in the picture to be coded, that satisfies Poisson's Equation, thus producing a first predictive picture. The residual picture is then produced with the first predictive picture as the predictive picture and encodes the residual picture.

10 Claims, 20 Drawing Sheets

U.S. PATENT DOCUMENTS

| | | | | |
|---|---|---|---|---|
| 5,822,465 A * | 10/1998 | Normile et al. | | 382/253 |
| 6,307,885 B1 * | 10/2001 | Moon et al. | | 375/240.08 |
| 6,337,925 B1 * | 1/2002 | Cohen et al. | | 382/199 |
| 6,853,683 B2 * | 2/2005 | Song et al. | | 375/240.25 |
| 7,027,507 B2 * | 4/2006 | Wu | | 375/240.03 |
| 7,158,713 B2 * | 1/2007 | Goto et al. | | 386/243 |
| 7,519,230 B2 * | 4/2009 | Wittebrood et al. | | 382/236 |
| 2005/0232357 A1 * | 10/2005 | Hubrich et al. | | 375/240.16 |
| 2009/0237503 A1 * | 9/2009 | Adiletta et al. | | 348/143 |
| 2011/0211108 A1 * | 9/2011 | Pollard | | 348/349 |
| 2011/0211642 A1 * | 9/2011 | Cho et al. | | 375/240.16 |

* cited by examiner

MOVING-PICTURE CODING APPARATUS, METHOD AND PROGRAM, AND MOVING-PICTURE DECODING APPARATUS, METHOD AND PROGRAM

CROSS-REFERENCE TO RELATED APPLICATIONS

This application is based on and claims the benefit of priority from the prior Japanese Patent Application Nos. 2006-112995 filed on Apr. 17, 2006 and 2007-93162 filed on Mar. 30, 2007, the entire contents of which are incorporated herein by reference.

BACKGROUND OF THE INVENTION

The present invention relates to a moving-picture coding apparatus, method and program, and a moving-picture decoding apparatus, method and program, with a boundary condition obtained between moving-picture blocks and applied for coding or decoding.

Several types of video broadcast services via digital broadcasts or networks are popular now. This creates a demand for higher moving-picture coding efficiency for recording a larger amount of moving pictures at a higher picture quality and definition.

There are now several new coding methods, such as, MPEG-4 AVC (which will be referred to as AVC or H. 264, hereinafter) with drastically higher coding efficiency than known coding methods. These new coding methods promote more efficient data encoding. The methods perform video-data compression with combination of MC (Motion Compensation) and DCT (Discrete Cosine Transform).

Known MC is conducted for each rectangular zone (typically, a square block which will be referred to as an MC block or simply a block, hereinafter), to detect the degree of motion based on the assumption that all of the pixels in each rectangular zone exhibit the same motion, thus generating motion-vector data. Thus, there is a case in that a video signal is discontinuous on an MC-block border in a predictive picture constituted by spatially arranged MC blocks. Such a discontinuous situation on the MC-block border results from per-block coding procedures, such as, detection of the degree of motion followed by orthogonal transform, quantization, etc. This phenomenon becomes more remarkable as the amount of data for use in coding becomes smaller, which is mostly noticeable as block distortion.

Especially, discontinuity on a block border and mismatching of texture data in block are mostly caused by a larger motion of an object in a moving picture, deformation of the object itself, variation in relativity among several objects, i.e., disappearance or appearance of the objects, etc., between pictures of moving objects.

A method to remedy the discontinuous situation on an MC-block border discussed above is disclosed, for example, in International Publication No. WO2003/003749A1. In this method, a procedure to adaptively smooth a discontinuous waveform generated on a border of MC blocks in a predictive picture produced by per-block motion compensation is performed by a relatively easy operation with a smoothing filter provided following to a motion compensator. This enhances coding efficiency at a low bit rate with motion compensation.

The above method applies smoothing to a video signal at pixels adjacent to a border of blocks in aiming for mitigating a discontinuous situation in order to remedy the discontinuous situation between blocks and mismatching of texture data. The discontinuous situation between blocks may, however, not be mitigated enough, which depends on the degree of smoothing.

For example, a lower degree of smoothing than required cannot mitigate enough a discontinuous situation between blocks which thus remains as block distortion. In contrast, a higher degree of smoothing than required can mitigate the discontinuous situation between blocks, which is, nevertheless, too much for texture data in block, thus resulting in low quality in the texture data.

Smoothing is followed by orthogonal transform, quantization and entropy coding to a residual video frame produced by subtraction between a reference picture and a moving-picture frame to be coded. Smoothing is applied to a predictive picture produced by motion compensation after an optimum block is selected in motion estimation, thus such a block may not always be optimum after this procedure. There may be several blocks having the same quality as that block in the predictive picture after smoothing. Thus, it requires a larger amount of computation for obtaining more appropriate motion-vector data under consideration of the code amount of motion-vector data and orthogonal-transform coefficients data after quantization, because of repeated operations of motion estimation, motion compensation and smoothing procedures for obtaining optimum motion-vector data.

SUMMARY OF THE INVENTION

A purpose of the present invention is to provide a moving-picture coding apparatus, method and program, and a moving-picture decoding apparatus, method and program that, without a smoothing procedure, can produce a predictive picture maintaining continuity of a video signal included in the predictive picture even on a block border, with no discontinuous state between blocks which appears in typical motion estimation and compensation.

Another purpose of the present invention is to provide a moving-picture coding apparatus, method and program, and a moving-picture decoding apparatus, method and program that can efficiently transfer, receive or reproduce a coded bitstream having a coded amount smaller than known art.

The present invention provides a moving-picture coding apparatus comprising: a predictive encoder to produce and encode a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided; a zone-border motion estimator to obtain a boundary condition of each of a plurality of borders between the rectangular zones and another plurality of rectangular zones adjacent to the rectangular zones, find a border, of the reference picture, having a boundary condition that matches the boundary condition, by motion-vector search in the reference picture, and generate border motion-vector data that is data on a motion vector from a border of the rectangular zone in the picture to be coded to the border of the reference picture thus found; and a zone-border motion compensator to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture, wherein the predictive encoder produces the residual picture with the first predictive picture as the predictive picture and encodes the residual picture.

Moreover, the present invention provides a moving-picture coding program comprising: a predictive encoding program code to produce and encode a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided; a zone-border motion estimation program code to obtain a boundary condition of each of a plurality of borders between the rectangular zones and another plurality of rectangular zones adjacent to the rectangular zones, find a border, of the reference picture, having a boundary condition that matches the boundary condition, by motion-vector search in the reference picture, and generate border motion-vector data that is data on a motion vector from a border of the rectangular zone in the picture to be coded to the border of the reference picture thus found; and a zone-border motion compensation program code to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture, wherein the predictive encoding program code produces the residual picture with the first predictive picture as the predictive picture and encodes the residual picture.

Furthermore, the present invention provides a moving-picture decoding apparatus comprising: a demultiplexer to demultiplex coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture; an entropy decoder to perform entropy decoding to the data thus demultiplexed to generate, at least, the post-quantization data, the border motion-vector data and parameter data required for constructing a specific syntax structure; an inverse-quantizer to perform inverse-quantization to the post-quantization data to generate post-quantization orthogonal transform coefficients data; an inverse-orthogonal transformer to perform inverse-orthogonal transform to the post-quantization orthogonal transform coefficients data to produce a decoded residual picture of one video area; a zone-border motion compensator to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture; a combiner to combine the first predictive picture and the decoded residual picture to generate a decoded moving-picture signal; and a memory to store the decoded moving-picture signal for at least one picture as a reference picture.

Furthermore, the present invention provides a moving-picture decoding program comprising: a demultiplex program code to demultiplex coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture; an entropy decoding program code to perform entropy decoding to the data thus demultiplexed to generate, at least, the post-quantization data, the border motion-vector data and parameter data required for constructing a specific syntax structure; an inverse-quantization program code to perform inverse-quantization to the post-quantization data to generate post-quantization orthogonal transform coefficients data; an inverse-orthogonal transform program code to perform inverse-orthogonal transform to the post-quantization orthogonal transform coefficients data to produce a decoded residual picture of one video area; a zone-border motion compensation program code to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture; and a combine program code to combine the first predictive picture and the decoded residual picture to generate a decoded moving-picture signal, the decoded moving-picture signal for at least one picture being stored as a reference picture.

Moreover, the present invention provides a moving-picture coding method comprising the steps of: producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided; obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating border motion-vector data that is data on a motion vector from a border of the rectangular zone in the picture to be coded to the border of the reference picture thus found; defining a boundary condition of a border that corresponds to the border motion vector data, from the reference picture based on the border motion-vector data, and generating an estimated video signal in each rectangular zone in the picture to be coded, that satisfies Poisson's Equation, thus producing a predictive picture; producing a first residual picture from a difference between the picture to be coded and the predictive picture; performing orthogonal transform to the first residual picture, thus generating orthogonal-transform coefficients data; performing quantization to the orthogonal-transform coefficients data based on a specific quantization parameter, thus generating post-quantization data; performing inverse-quantization to the post-quantization data based on a specific quantization parameter, thus generating post-inverse-quantization data; and performing inverse-orthogonal transform to the post-inverse-quantization data, thus producing a decoded residual picture.

Moreover, the present invention provides a moving-picture decoding method comprising the steps of: demultipling coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture; performing entropy decoding to the data thus demultiplexed to generate, at least, the post-quantization data, the border motion-vector data and parameter data required for constructing a specific syntax structure; performing inverse-quantization to the post-quantization data to generate post-quantization orthogonal transform coefficients data; performing inverse-orthogonal transform to the post-quantization orthogonal transform coefficients data to produce a decoded residual picture of one video area; defining a boundary condition of a border that corresponds to the border motion vector data, from the reference picture based on the border motion-vector data, and generate an estimated video signal in each rectangular zone in the picture to be coded, that satisfies Poisson's Equation, thus producing a predictive picture; combining the first predictive picture and the decoded residual picture to generate a decoded moving-picture signal; and storing the decoded moving-picture signal for at least one picture as a reference picture.

DETAILED DESCRIPTION OF PREFERRED EMBODIMENTS

Embodiments of the present invention will be described with reference to drawings. In the following disclosure, ordinals, such as a first, a second, etc., are only used for discriminating terms, such as "picture", from each other, not used for indicating the order.

Embodiment I

Disclosed first are first embodiments of a moving-picture coding apparatus, a moving-picture decoding apparatus, and their corresponding methods according to the present invention.

Figure 1:
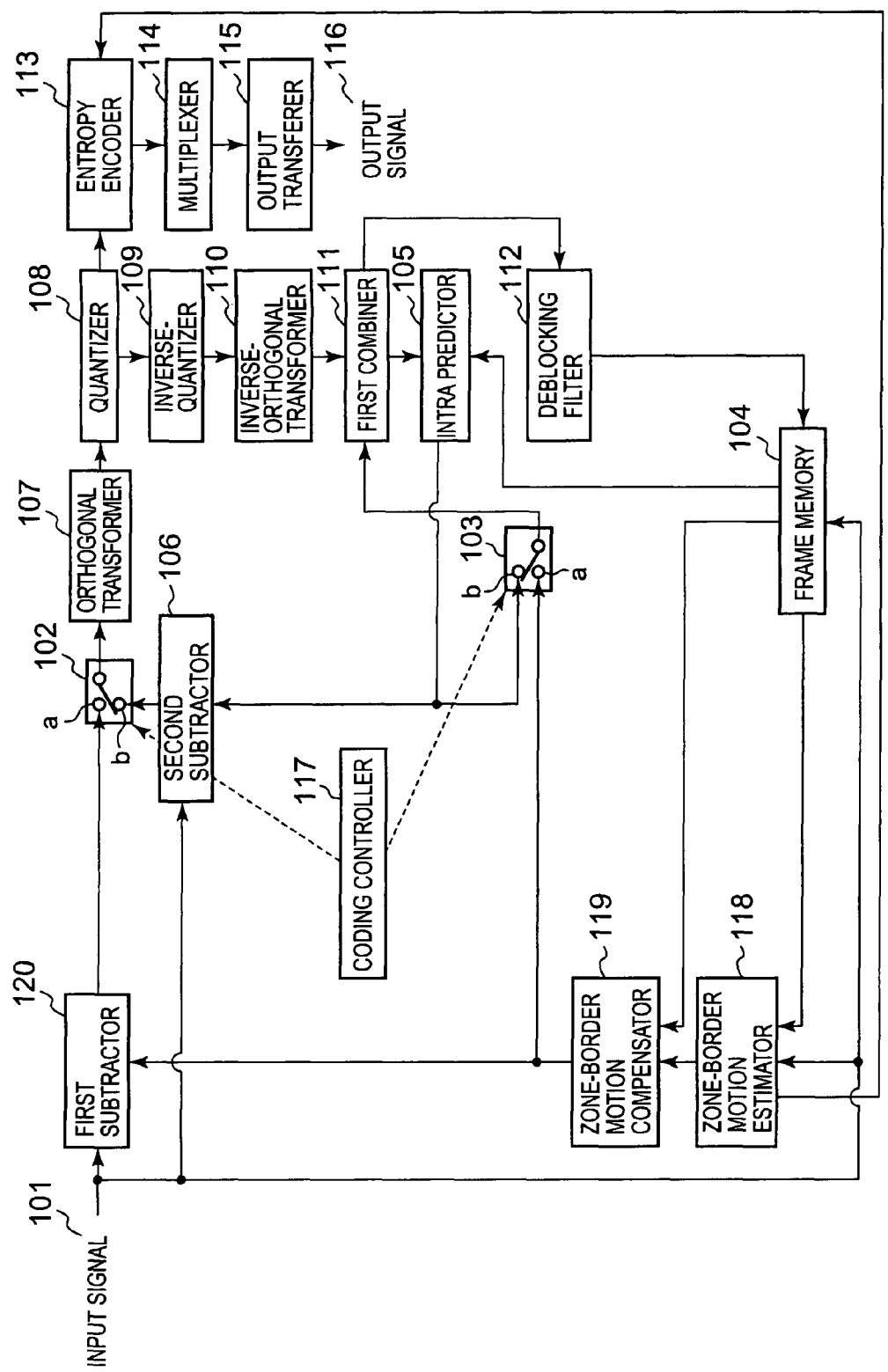
FIG. 1 is a block diagram of a first embodiment of a moving-picture coding apparatus according to the present invention.

FIG. 1 shows a block diagram of a first embodiment of a moving-picture coding apparatus according to the present invention. As shown in FIG. 1, the coding apparatus in this embodiment is equipped at least with a switch 102, a switch 103, a frame memory 104, a second subtractor 106, an orthogonal transformer 107, a quantizer 108, an inverse-quantizer 109, an inverse-orthogonal transformer 110, a first combiner 111, an entropy encoder 113, a multipixer 114, an output transferer 115, a coding controller 117, a zone-border motion estimator 118, a zone-border motion compensator 119, and a first subtractor 120. Moreover, it is preferable for the coding apparatus to be equipped with an intra predictor 105 and a deblocking filter 112, as shown in FIG. 1. This embodiment features the zone-border motion estimator 118 and the zone-border motion compensator 119, without such a smoothing filter in the known technology discussed above. The component parts except the multiplexer 114, the output transferer 115, the coding controller 117, the zone-border motion estimator 118, and the zone-border motion compensator 119 are referred to as a predictive encoder.

Disclosed next in detail is the component parts of the first embodiment of the moving-picture coding apparatus according to the present invention.

The switch 102 switches a picture between a second residual picture sent from the second subtractor 106 and a first residual picture sent from the first subtractor 120, in response to an instruction from the coding controller 117, to supply a necessary residual picture to the orthogonal transformer 107. As disclosed later, the second residual picture is produced from a picture to be coded and a fourth predictive picture through intra prediction whereas the first residual picture is produced from the picture to be coded and a first predictive picture through zone-border motion compensation.

The switch 103 switches a picture between the first predictive picture sent from the zone-border motion compensator 119 and the fourth predictive picture sent from the intra predictor 105, in response to an instruction from the coding controller 117, to supply a necessary predictive picture to the first combiner 111.

The frame memory 104, in FIG. 1, receives a decoded picture from the deblocking filter 112 after deblocking filtering and stores it as a reference picture. It may also store a picture to be coded that is an input signal 101, as a reference picture depending on an encoding mode. Moreover, the frame memory 104 supply a required reference picture to any component parts of the coding apparatus, at least, to the intra predictor 105, the zone-border motion estimator 118, and the zone-border motion compensator 119.

The second subtractor 106 receives the picture to be coded, the input signal 101, and the fourth predictive picture from the intra predictor 105, and takes a difference between the picture to be coded and the fourth predictive picture, to produce the second residual picture which is then supplied to a terminal "b" of the switch 102.

The orthogonal transformer 107 receives a residual picture from the switch 102 and performs orthogonal transform to the residual picture, thus generating orthogonal-transform coefficients data which are then supplied to the quantizer 108. Here, the basis for orthogonal transform is the DCT (Discrete Cosine Transform) basis. The orthogonal-transform coefficients data thus generated are preferably DCT coefficients data. Although DCT is used as the orthogonal transform basis in this embodiment, the present invention is not limited to this orthogonal transform basis.

The quantizer 108 receives the DCT coefficients data from the orthogonal transformer 107 and quantizes the data based on a specific quantization parameter to generate post-quantization data which are then supplied to the inverse-quantizer 109 and the entropy encoder 113. The inverse-quantizer 109 receives the post-quantization data from the quantizer 108 and performs inverse-quantization to the data based on a specific quantization parameter to generate post-inverse-quantization data which are then supplied to the inverse-orthogonal transformer 110.

The inverse-orthogonal transformer 110 performs inverse-orthogonal transform to the post-inverse-quantization data to produce a decoded residual picture which is then supplied to the first combiner 111. The first combiner 111 receives the decoded residual picture from the inverse-orthogonal transformer 110 and the predictive picture from the switch 103. It combines the decoded residual picture and the predictive picture to produce a decoded picture which is then supplied to the intra predictor 105 and the deblocking filter 112.

The entropy encoder 113 receives at least post-quantization data from the quantizer 108 and border motion-vector data from the zone-border motion estimator 118. Here, it is preferable for the entropy encoder 113 to receive other parameter data, for example, required for constructing a specific syntactic structure, from the respective component parts of the coding apparatus. The parameter data required for constructing such a specific syntactic structure may preferably include macroblock data indicating any kind of state of a macroblock, quantization parameter data for use in quantization and inverse-quantization, intra-prediction mode data for specifying a mode of intra prediction, frame-order data for specifying the order of referring to reference video frames, etc. The entropy encoder 113 performs entropy coding to the above several types of data to generate coded bit strings which are then supplied to the multiplexer 114.

The multiplexer 114 multiplexes coded bit strings based on the specific syntactic structure to generate a coded bitstream which is then supplied to the output transferer 115.

The output transferer 115 performs a packetization procedure to the coded bitstream to produce packet data so that the bitstream carries specific packet headers and payloads when output to a transfer line or a storage medium (either not shown), as an output signal 116. For the packet data, a packet header and a payload are treated as one unit. Typically, a packetization procedure is performed in such a way that a coded bitstream is divided into smaller ones and loaded into payloads and added with packet headers. The output transferer 115 outputs the packet data as the output signal 116 depending on the state of the transfer line or storage medium.

The coding controller 117 supplies several types of parameter data required for coding to the respective component parts of the coding apparatus (connection for supplying the parameter data is omitted from FIG. 1), in order to control the operation of the coding apparatus of the present invention. It further supplies the used parameter data to the entropy encoder 113. Moreover, the coding controller 117 performs input/output control to the respective component parts, and, at least, performs switching control between the switches 102 and 103.

The zone-border motion estimator 118 receives an input picture to be coded in a picture zone of an input moving-picture signal to be coded and a reference picture stored in the frame memory 104. Here, a picture zone is a frame, which may, however, be a slice or filed instead of a frame. The zone-border motion estimator 118 divides the picture to be coded into block zones, a plurality of rectangular zones, each of which consists of specific number of pixels, and calculates a gradient (which will be discussed later) of the video signal at each of sides among blocks in the picture to be coded, that is a boundary condition at each side. This utilizes a feature in that, once a boundary condition is determined in a specific zone, an estimated signal that satisfies Poisson's Equation can be generated based on the boundary condition in that zone.

Moreover, the zone-border motion estimator 118 performs zone-border motion estimation to find out the location of a gradient of a video signal in the reference picture through motion-vector search, the closest to a gradient of the video signal in each side of a block in the picture to be coded, while calculating a gradient of the video signal at each side, thus generating border motion-vector data. The generated border motion-vector data is supplied to the zone-border motion compensator 119 and the entropy encoder 113.

The zone-border motion compensator 119 receives the border motion-vector data from the zone-border motion estimator 118 and the reference picture from the frame memory 104. It performs zone-border motion compensation to find out a gradient of the video signal in each side of a block, required for generating an estimated signal in a block, based on the border motion-vector data, apply the gradient thus found to Poisson's Equation to generate a predictive signal in a block that is a predictive signal per block in a picture, thus producing a first predictive picture. The produced first predictive picture is supplied to a terminal "a" of the switch 103 and the first subtractor 120.

The first subtractor 120 receives a picture to be coded in a moving picture that is the input signal 101 and the first predictive picture from the zone-border motion compensator 119, to produce a first residual picture based on the difference between the picture to be coded and the first predictive picture, the first residual picture being supplied to a terminal "a" of the switch 102.

The intra predictor 105 receives a decoded picture from the first combiner 111 and produces a fourth predictive picture through intra prediction. A picture to be used in intra prediction may be sent from the frame memory 104. The fourth predictive picture is supplied to a terminal "b" of the switch 103 and the second subtractor 106.

The deblocking filter 112 receives the decoded picture from the first combiner 111 and, after performing a deblocking filtering procedure, supplies the decoded picture thus deblocking-filtered to the frame memory 104 to store the decoded picture as a reference picture.

Disclosed next with reference to FIGS. 13 to 16 are the zone-border motion estimation and the zone-border motion compensation procedures performed by the zone-border motion estimator 118 and the zone-border motion compensator 119, respectively, that are the major components of the coding apparatus in the first embodiment of the present invention.

Figure 13:
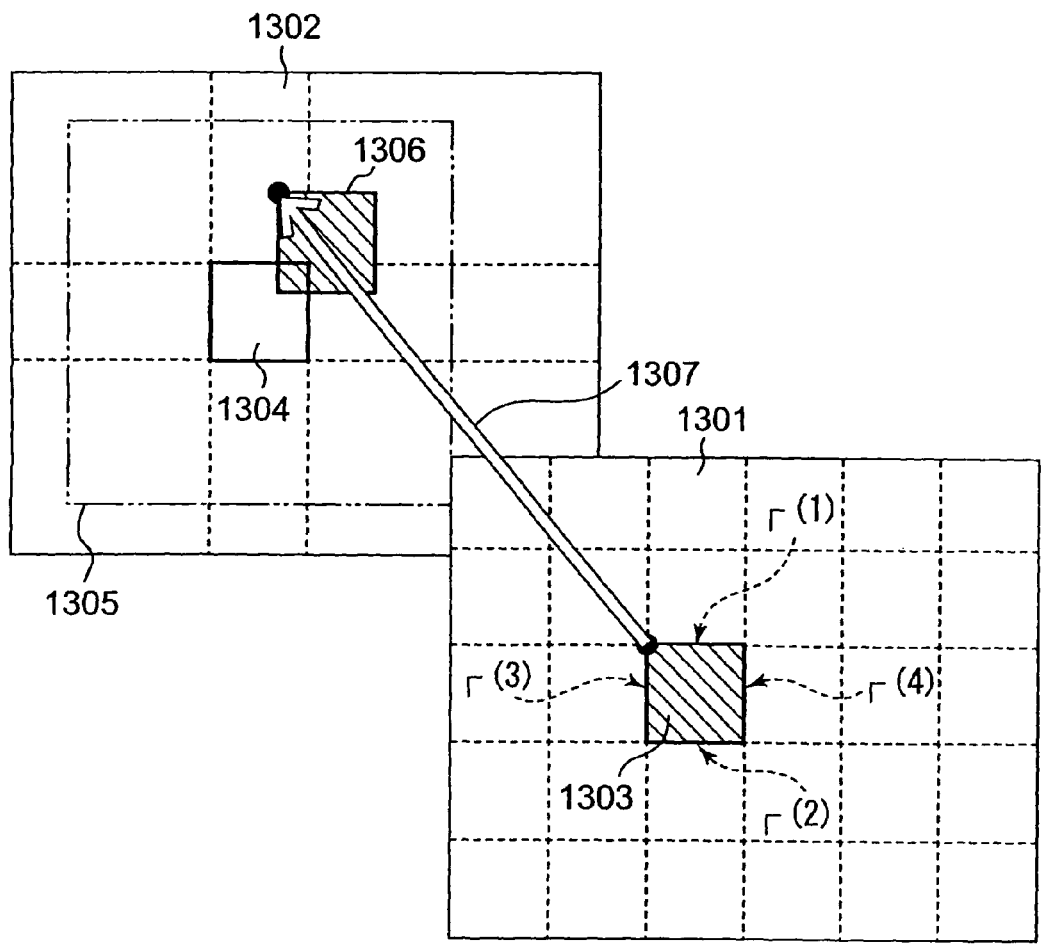
FIG. 13 is an illustration of a concept of motion estimation to generate motion-vector data with motion-vector search through typical block matching.

FIG. 13 is an illustration of a concept of motion estimation to generate motion-vector data with vector search through typical block matching. The size of a rectangular zone to be used in block matching is a block of 4 pixels in the horizontal direction and 4 pixels in the vertical direction, for expediency and clarity.

At first, a picture to be coded 1301 is divided into a specific number of blocks. Borders between a block that is an object to be predicted 1303 and the surrounding blocks are denoted by $\Gamma^{(1)}$, $\Gamma^{(2)}$, $\Gamma^{(3)}$ and $\Gamma^{(4)}$, respectively. Defined next in a reference picture 1302 is a base position 1304 that corresponds to a zone located at the same spatial position as the block, the object to be predicted 1303, in the picture to be coded 1301. Motion-vector search starts at the base position 1304.

Motion-vector search is, typically, performed with block matching at ½-pixel or ¼-pixel accuracy in a search zone 1305, indicated by a dash-dot-dot line, set in the reference picture 1302. Block matching is, typically, performed while searching a block that has the smallest SAD (Sum of Absolute Difference) in the search zone 1305 in the reference picture 1302, to find out a matched block 1306. This is followed by motion estimation to obtain motion-vector data 1307 that is a difference in spatial position between the block that is the object to be predicted 1303 and the matched block 1306.

Motion compensation is then performed by locating the matched block 1306 in the reference picture 1302 based on the motion-vector data 1307 and copying pixel data in the block 1306 and arranging the copied pixel data in the corresponding spatial locations in a predictive picture for each block of the predictive picture. Such per-block motion compensation occasionally causes discontinuity with no smooth continuity between blocks in terms of the characteristics of a video such as the shape or contour of an object in the video and the texture, the arrangement of shapes, colors or lines, in the video.

Figure 14:
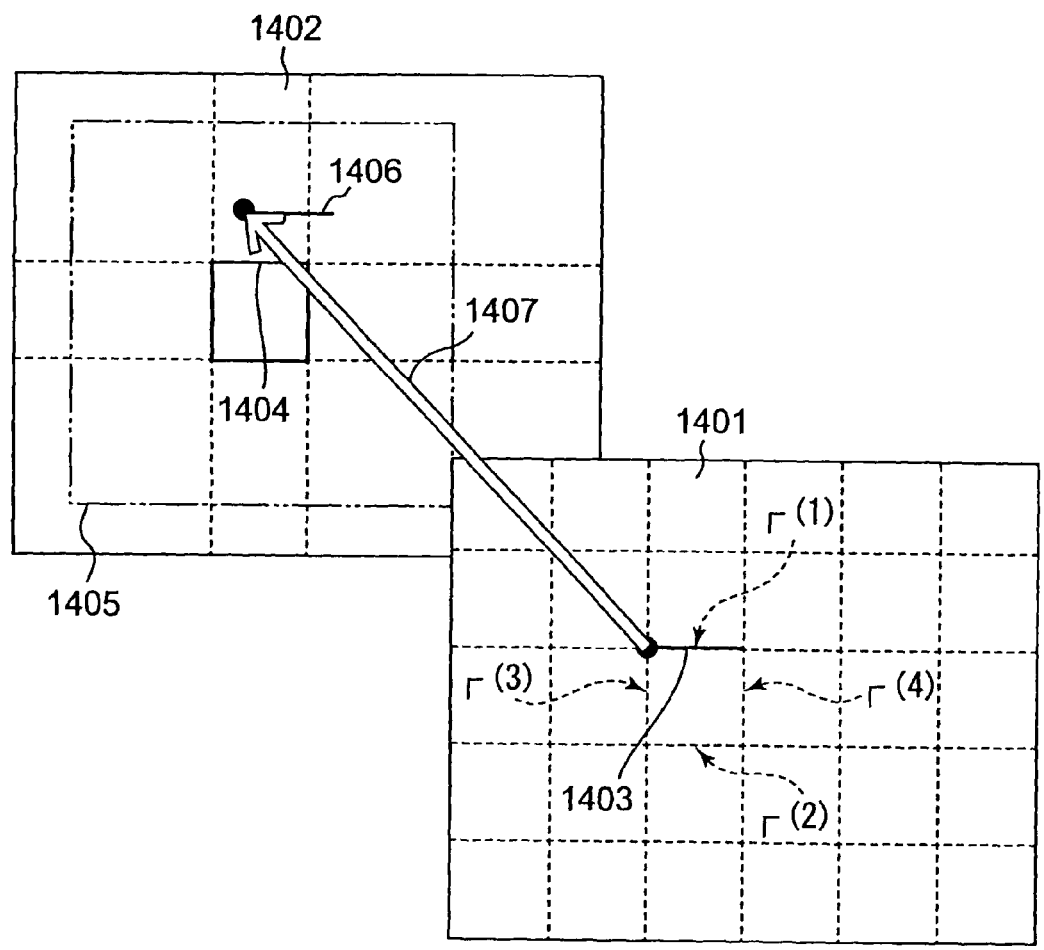
FIG. 14 is an illustration of a concept of a zone-border motion estimation procedure installed in a zone-border motion estimator of the first embodiment of the moving-picture coding apparatus according to the present invention.

FIG. 14 is an illustration of a concept of the zone-border motion estimation procedure performed by the zone-border motion estimator 118 of FIG. 1. In this zone-border motion estimation, motion-vector search is performed on block borders $\Gamma^{(1)}$, $\Gamma^{(2)}$, $\Gamma^{(3)}$ and $\Gamma^{(4)}$ of a block to be predicted. Here, zone-border motion estimation is performed with $\Gamma^{(1)}$ as an object to be predicted 1403.

Figure 15:
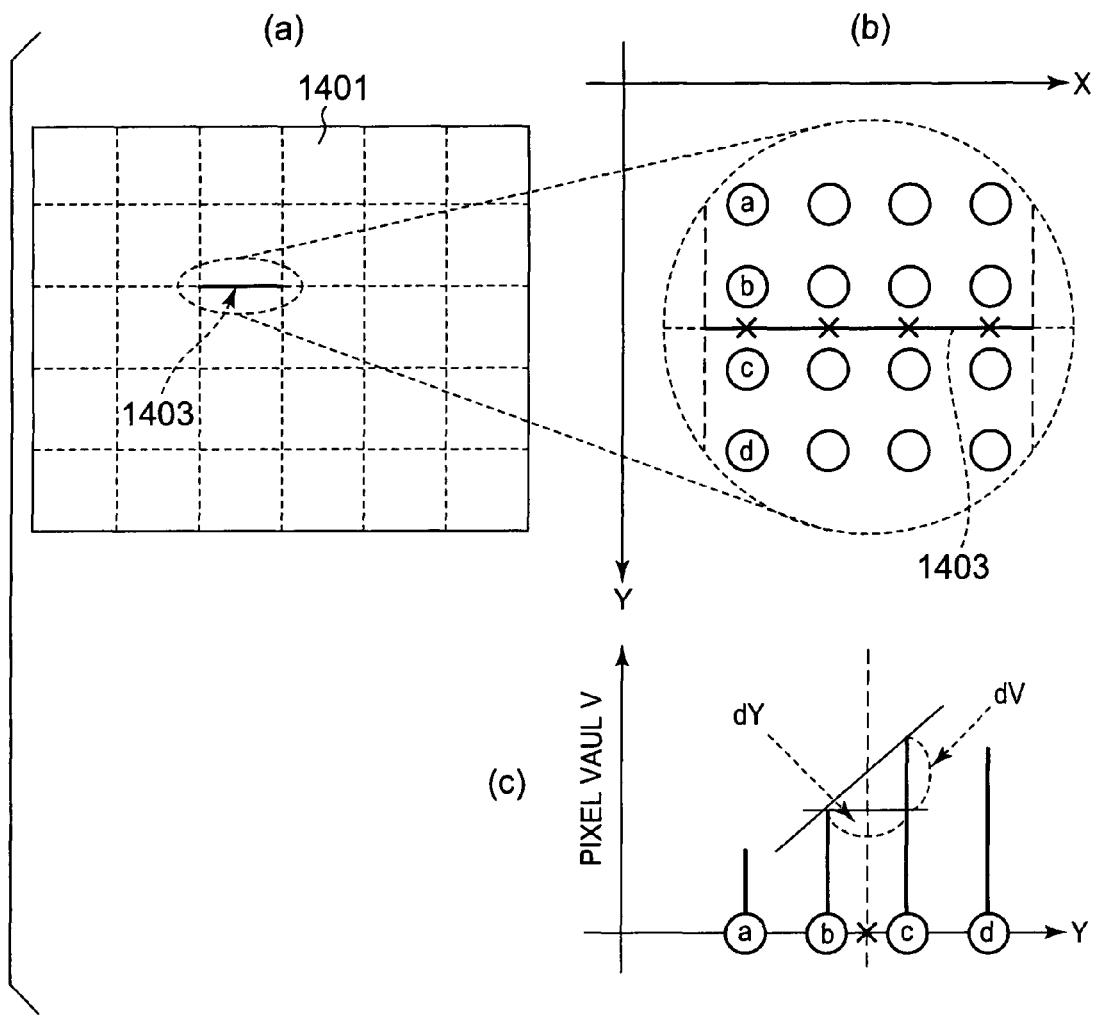
FIG. 15 is an illustration of obtaining gradient information on a block border, that is a boundary condition of the block border in a picture to be coded.

Obtained first is a boundary condition of the block border $\Gamma^{(1)}$, the object to be predicted 1403, as shown in (a) of FIG. 15. The boundary condition is preferably a gradient of a video signal on a block border. In an example, here, imaginary pixels are indicated by symbols "x", as shown in (b) of FIG. 15, and dY and dV are calculated to obtain a gradient dY/dV of each imaginary pixel of the symbol "x" from pixels adjacent to this imaginary pixel of the symbol "x", as shown in (c) of FIG. 15. Here, dY is a distance between pixels b" and "c" and dV is a pixel value such as a luminance or a chrominance component of the pixels b" and "c".

In this way, the zone-border motion estimator 118 in the first embodiment obtains border gradient data that is a boundary condition of a block border in a picture to be coded. Then, in the first embodiment, the obtained border gradient data is defined as the best gradient data that is the closest gradient to the gradient of an original signal on the block border, and then found out from a search zone in a reference picture is a block border having the gradient, the closest to the best gradient data.

In detail, what is set in a reference picture 1402 in FIG. 14 is a search zone 1405 indicated by a dash-dot-dot line.

Defined next in the reference picture 1402 is a base position 1404 that corresponds to a border of a block located at the same spatial position as the block border $\Gamma^{(1)}$ of a block that is an object to be predicted 1403 in the picture to be coded 1401. Gradient data of the base position 1404 is then calculated and compared with the best gradient data. Comparison, here, may be performed with SAD used in ordinary motion estimation.

Thereafter, target borders are scanned one by one in the search zone 1405 in the reference picture 1402 at ½-pixel or ¼-pixel accuracy, and then gradient data is calculated for each scanned target border and compared with the best gradient data, which is repeated for every target border, to find out a border 1406, the best-matched, in the search zone 1405 of the reference picture 1402. This is followed by zone-border motion estimation to obtain zone-border motion-vector data 1407 that is a difference in spatial position between the border of the block that is the object to be predicted 1403 in the picture to be coded 1402 and the best-matched border 1406 in the reference picture 1402.

Figure 16:
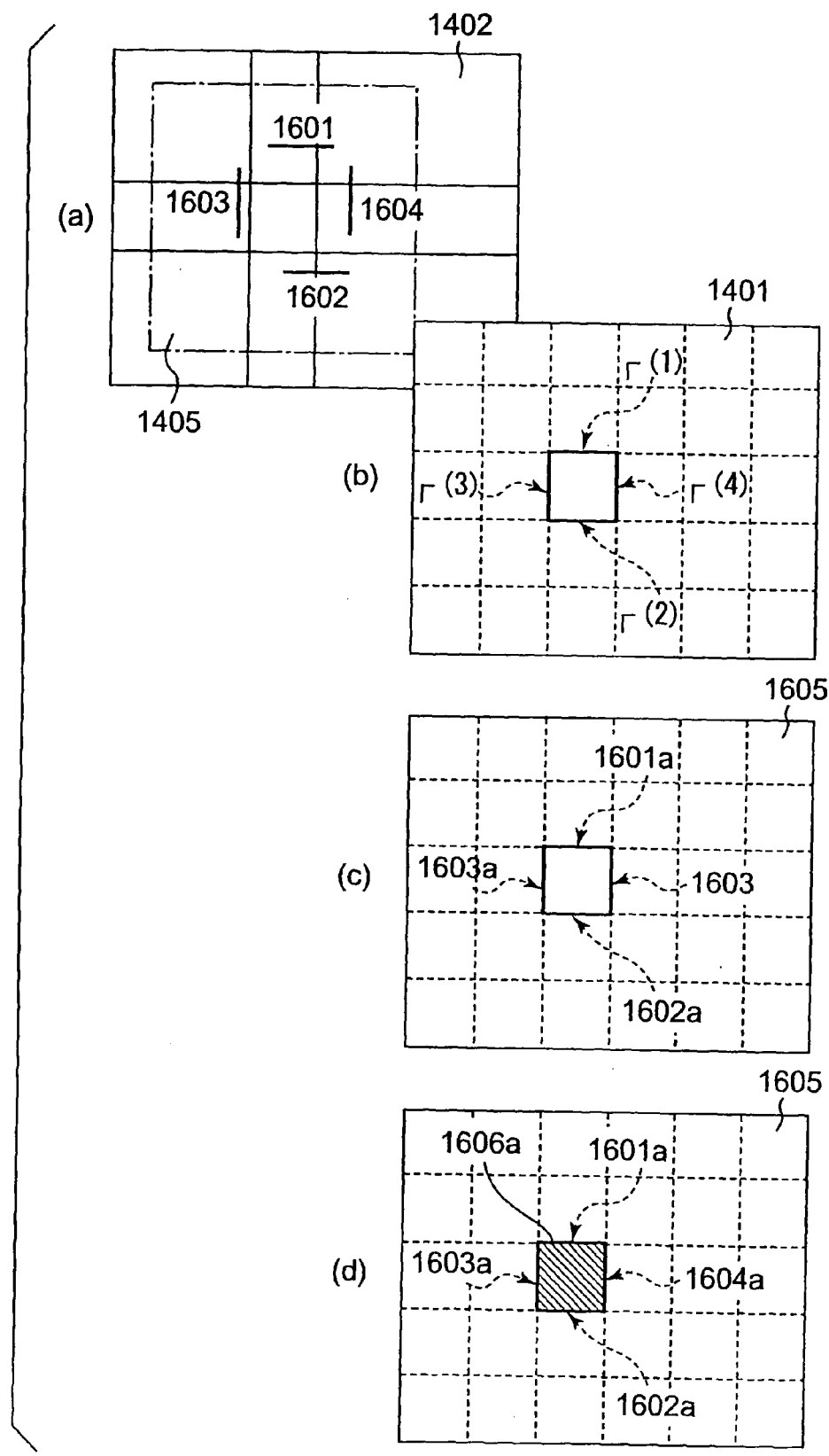
FIG. 16 is an illustration of production of a predictive picture through a procedure of generating a predictive signal in a block and applying the predictive signal to a predictive block for each block of a predictive picture to be generated.

Next, as shown in FIG. 16, what are defined as gradient data of a video signal on borders 1601$a$, 1602$a$, 1603$a$ and 1604$a$ in a predictive picture 1605 in ($c$) of FIG. 16, are gradient data that are boundary conditions of borders 1601, 1602, 1603 and 1604 in the reference picture 1402 in ($a$) of FIG. 16 that match the block borders $\Gamma^{(1)}$, $\Gamma^{(2)}$, $\Gamma^{(3)}$ and $\Gamma^{(4)}$ of the block to be predicted in the picture to be coded 1401. Poisson's Equation is then applied based on the gradient data of the video signal thus defined to generate a predictive signal in block which is then applied to a predictive block 1606$a$, as shown in ($d$) of FIG. 16. These procedures are performed for each block of a predictive picture, thus producing the predictive picture, completion of the zone-border motion estimation.

Discussed next is PHLCT (Polyharmonic Cosine Transform) employed in the first embodiment in generation of a predictive signal in block with the gradient of a video signal on each side of a specific block applied as a boundary condition to Poisson's. Equation.

Figure 17:
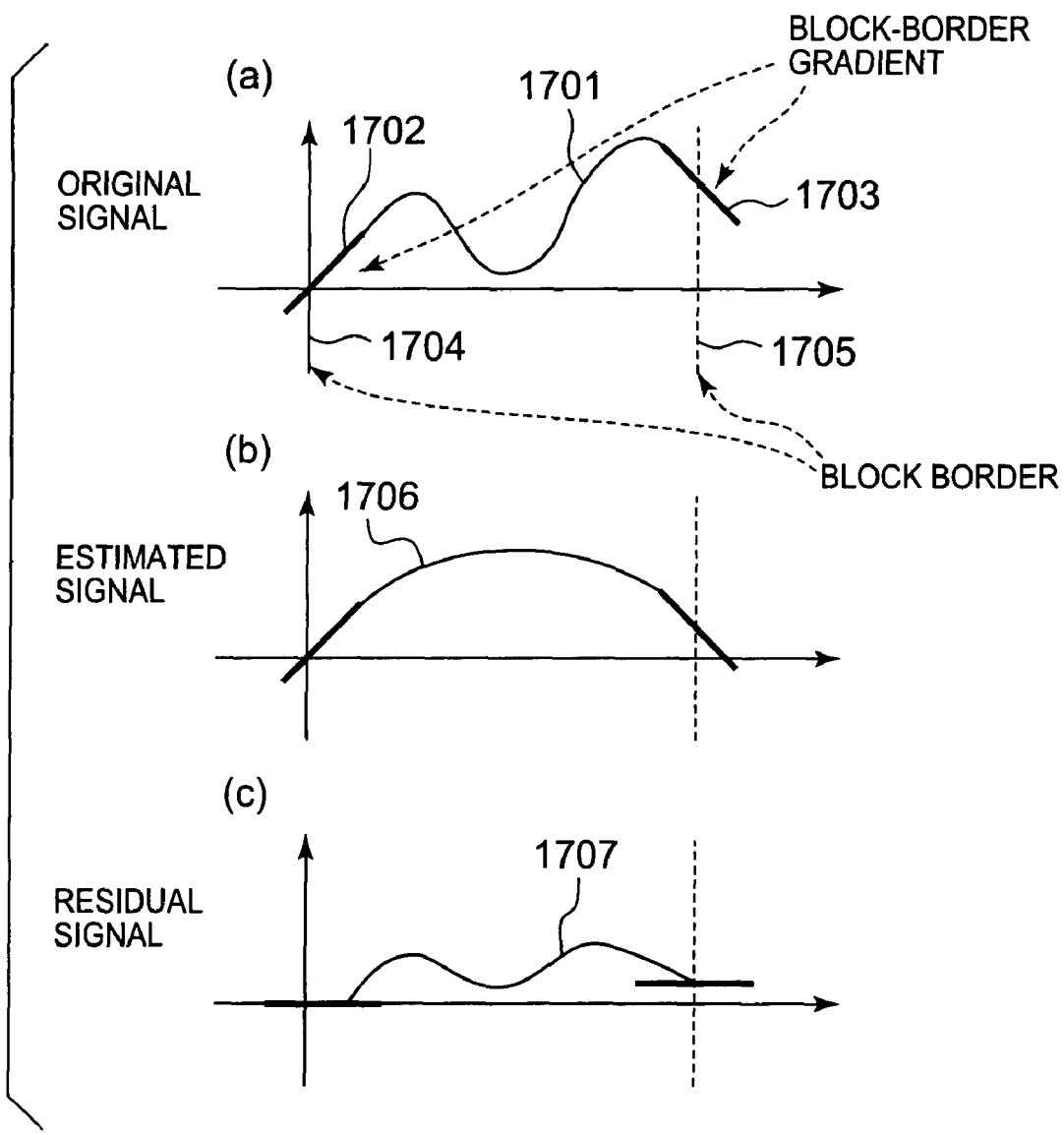
FIG. 17 is an illustration of a basic concept of polyharmonic cosine transform.

FIG. 17 is an illustration of a basic concept of PHLCT. PHLCT is a scheme to enhance DCT coding efficiency used for example in JPEG, as discussed in "Improvement of DCT-based Compression Algorithms Using Poisson's Equation". FIG. 17 illustrates transition of an original signal on a specific line and a boundary state of the original signal on block borders on the specific line in a specific block in an original video frame in the scheme. For an original signal 1701 shown in ($a$) of FIG. 17, gradients 1702 and 1703 of the video signal are obtained on both edges of the original signal 1701, that correspond to block borders 1704 and 1705. The gradients 1702 and 1703 of the video signal on both edges are defined as boundary conditions. PHLCT is a scheme to generate an estimated signal, from DCT coefficients, based on a block boundary condition by means of a signal in a block represented by a specific source model, such as a quadratic function that defines behavior of the signal in the block.

An estimated signal 1706, such as shown in ($b$) of FIG. 17, is generated here under boundary conditions that are the gradients of the video signal on both edges of the original signal 1701. It is preferable to employ a source model enabling estimation of a signal the closest to the original signal under the boundary conditions. A quadratic function is a typical example of the source model for a one-dimensional signal, such as shown in FIG. 17. The present invention is, however, not limited to this model, a lower-order function such as a liner function or a higher-order function such as a cubic function and a quartic function are available. Accordingly, this embodiment implements the source model in generation of an estimated signal in a block analytically without mathematically solving Poisson's Equation with a huge amount of calculation.

The zone-border motion compensator 119 in this embodiment performs zone-border motion compensation with production of the first predictive picture by means of a predictive signal per block in a picture based on a predictive signal in block generated through application of such a source model, discussed above, with a boundary condition, here, the gradient of a video signal, determined in a reference picture by the zone-border motion estimator 118.

After the zone-border motion compensator 119 generates the estimated signal 1706, such as shown in ($b$) of FIG. 17, under the boundary conditions, the first subtractor 120 takes a difference between the original signal 1701 shown in ($a$) of FIG. 17 and the estimated signal 1706 shown in ($b$) of FIG. 17, to generate a residual signal 1707, such as shown in ($c$) of FIG. 17. Then, PHLCT is performed with typical orthogonal transform, such as, DCT, quantization and entropy coding to the residual signal 1707 thus generated.

Figure 18:
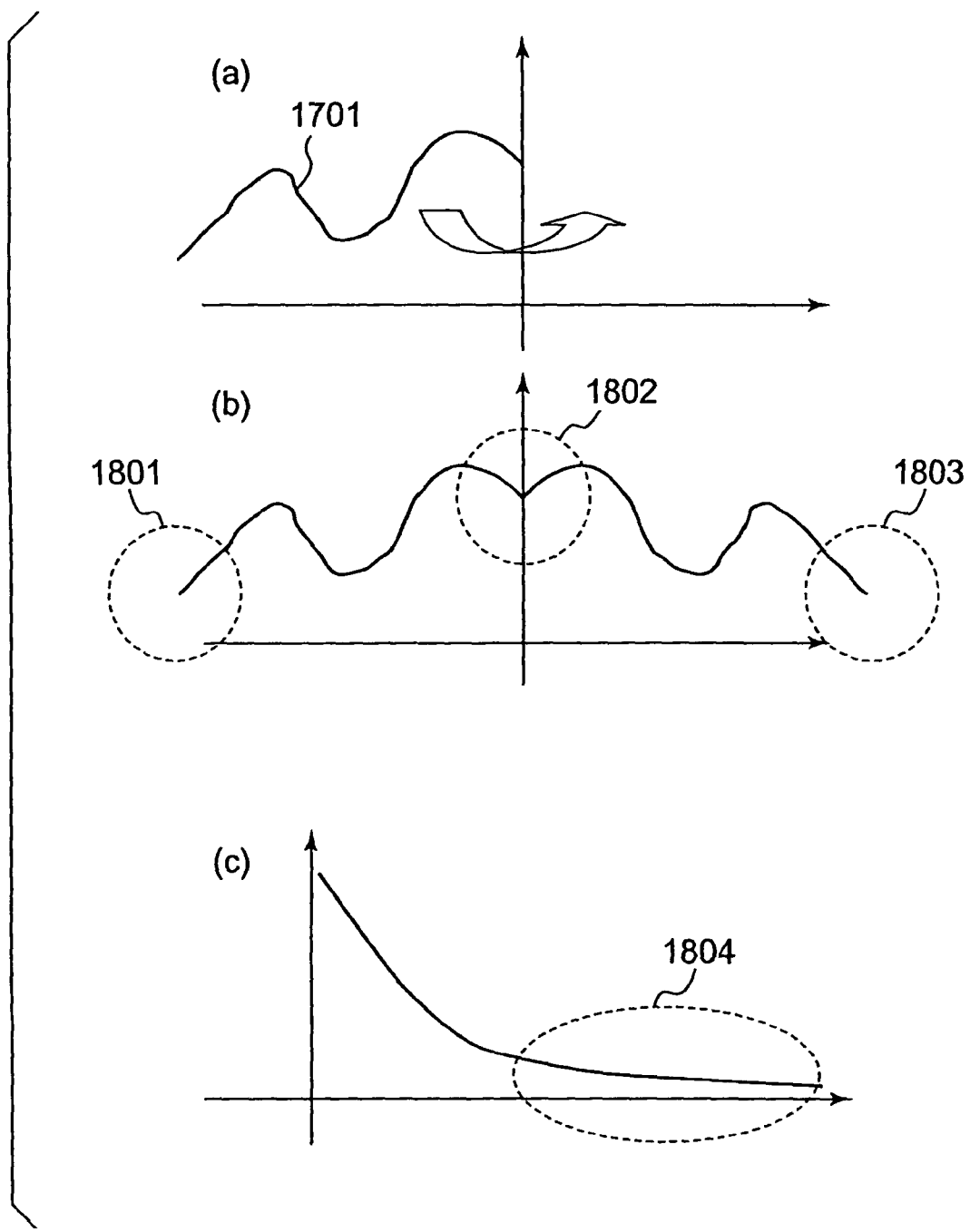
FIG. 18 is an illustration of ordinary DCT to an original signal.
Figure 19:
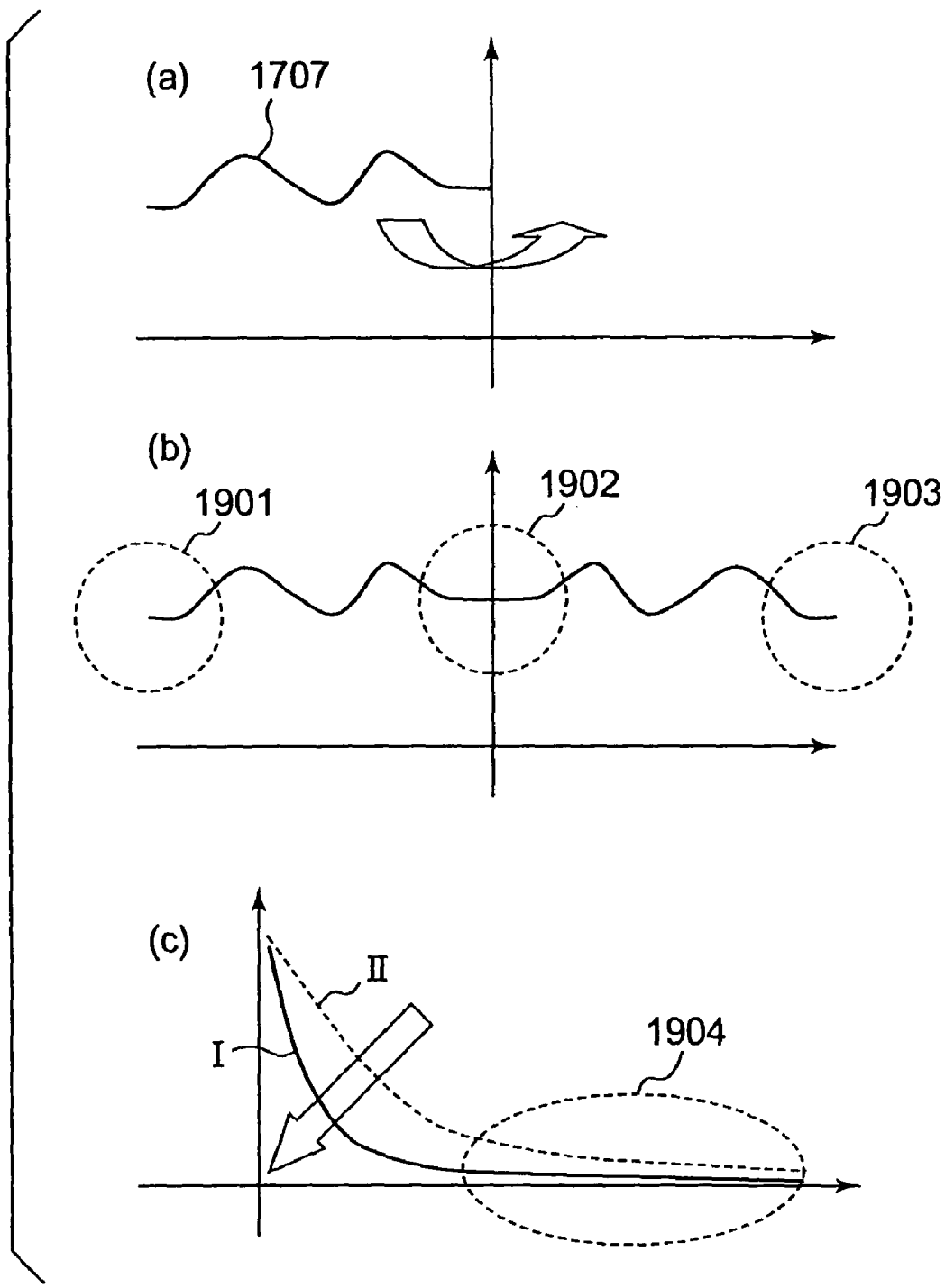
FIG. 19 is an illustration of ordinary DCT to a residual signal.

Discussed next with reference to FIGS. 18 and 19 is what a difference appears between PHLCT and typical DCT. This explains what effects are given by orthogonal transform that follows construction of a predictive picture with predictive blocks produced in this embodiment.

FIG. 18 illustrates typical DCT to the original signal 1701 in ($a$) of FIG. 17. In FIG. 18, the abscissa indicates a video signal focused only on the direction "x" and the ordinate indicates a value (a luminance level) of each pixel on one line of the video signal thus focused. A waveform in FIG. 18 is represented by a continuous function for expediency, but nevertheless discrete values in practical (the same true for FIG. 19).

A typical type of DCT is DCT-II. When DCT is performed to a finite original signal 1701 sectioned by a block such as shown in ($a$) of FIG. 18, the original signal 1701 is connected in even symmetry with respect to the axis (corresponding to the ordinate) that is either side of the block border, here, on the right side of the original signal 1701 in ($a$) of FIG. 18, thus a cyclical waveform signal of the original signal 1701 being obtained, as shown in ($b$) of FIG. 18. Connection in even symmetry here means that the original signal 1701 in ($a$) of FIG. 18 is folded to become an even symmetrical (line symmetrical) signal, such as shown in ($b$) of FIG. 18.

Conversion of the original signal 1701 to such a cyclical waveform signal enables representation with DCT series, such as shown in ($c$) of FIG. 18. Generally, connection in even symmetry to the original signal 1701 causes generation of signal components with insufficient smoothness, as indicated by dot sections 1801 to 1803. This affects the DCT series shown in ($c$) of FIG. 18 in that DCT coefficients, each corresponding to the levels of the DCT series, cannot converge enough even in a high-frequency component range, such as indicated by a dot section 1804 in ($c$) of FIG. 18, due to contamination of signal components different from those primarily included in the original signal. Quantization and entropy coding to such DCT coefficients thus generate a substantial amount of codes.

FIG. 19 illustrates typical DCT to the residual signal 1707 in ($c$) of FIG. 17. As explained with reference to FIG. 17, the estimated signal 1706 such as shown in ($b$) of FIG. 17 is generated by PHLCT, and then the difference between the estimated signal 1706 and the original signal 1701 shown in ($a$) of FIG. 17 is taken, thus the residual signal 1707 such as shown in ($c$) of FIG. 17 and ($a$) of FIG. 19 is obtained. The residual signal 1707 is then connected in even symmetry with respect to the axis, here, on the right side of the signal, thus a cyclical waveform signal of the residual signal 1707 being obtained, as shown in (*b*) of FIG. 19.

The cyclical waveform signal of the residual signal 1707 thus obtained has signal components with higher smoothness, at dot sections 1901 to 1903 each connecting a signal component of a former cycle to that of a latter cycle, than the cyclical waveform signal of the original signal 1701 at the corresponding dot sections 1801 to 1803, with being protected from contamination of unnecessary signal components primary not included in the original signal. Then, DCT to the cyclical waveform signal of the residual signal 1707 shown in (*b*) of FIG. 19, as a discrete cyclical waveform, gives a string of DCT coefficients, or residual orthogonal transform coefficients (here, residual DCT coefficients data), as indicated by I in (*c*) of FIG. 19. When the residual DCT coefficients data indicated by I in (*c*) of FIG. 19 are compared with the string of DCT coefficients through typical DCT indicated by II in (*c*) of the same figure, the DCT coefficients of the former are suppressed enough in a high-frequency range as indicated by a dot section 1904 (*c*) of FIG. 19, thus being converged into DCT coefficients having lower frequency components.

Accordingly, in the first embodiment, quantization and entropy coding are performed to DCT coefficients of a residual signal that is a difference between an original signal and an estimated signal derived from the gradient of a block border of the original signal through PHLCT. Therefore, according to the first embodiment, higher suppression of code amount is achieved compared to coding with typical DCT to the original signal, which leads to enhancement of coding efficiency.

As disclosed, according to the first embodiment, the estimated signal 1706 such as shown in (*b*) of FIG. 17 is generated by the zone-border motion compensator 119 through PHLCT as a predictive signal on a block border of each block. This predictive signal is generated based on boundary conditions around a block to be coded in a picture to be coded, determined by the zone-border motion estimator 118 as the closest to the gradient of a video signal. This makes the gradients on both ends of the residual signal 1707 are closer to zero as shown in (*c*) of FIG. 17, which is the difference between the estimated signal 1706 on block borders of each block and the original signal 1701 that is the input signal 101, which leads to expectation of the effects discussed above given by orthogonal transform at the orthogonal transformer 107.

The following is an exemplary scheme in generation of a predictive signal at the zone-border motion compensator 119.

Figure 20:
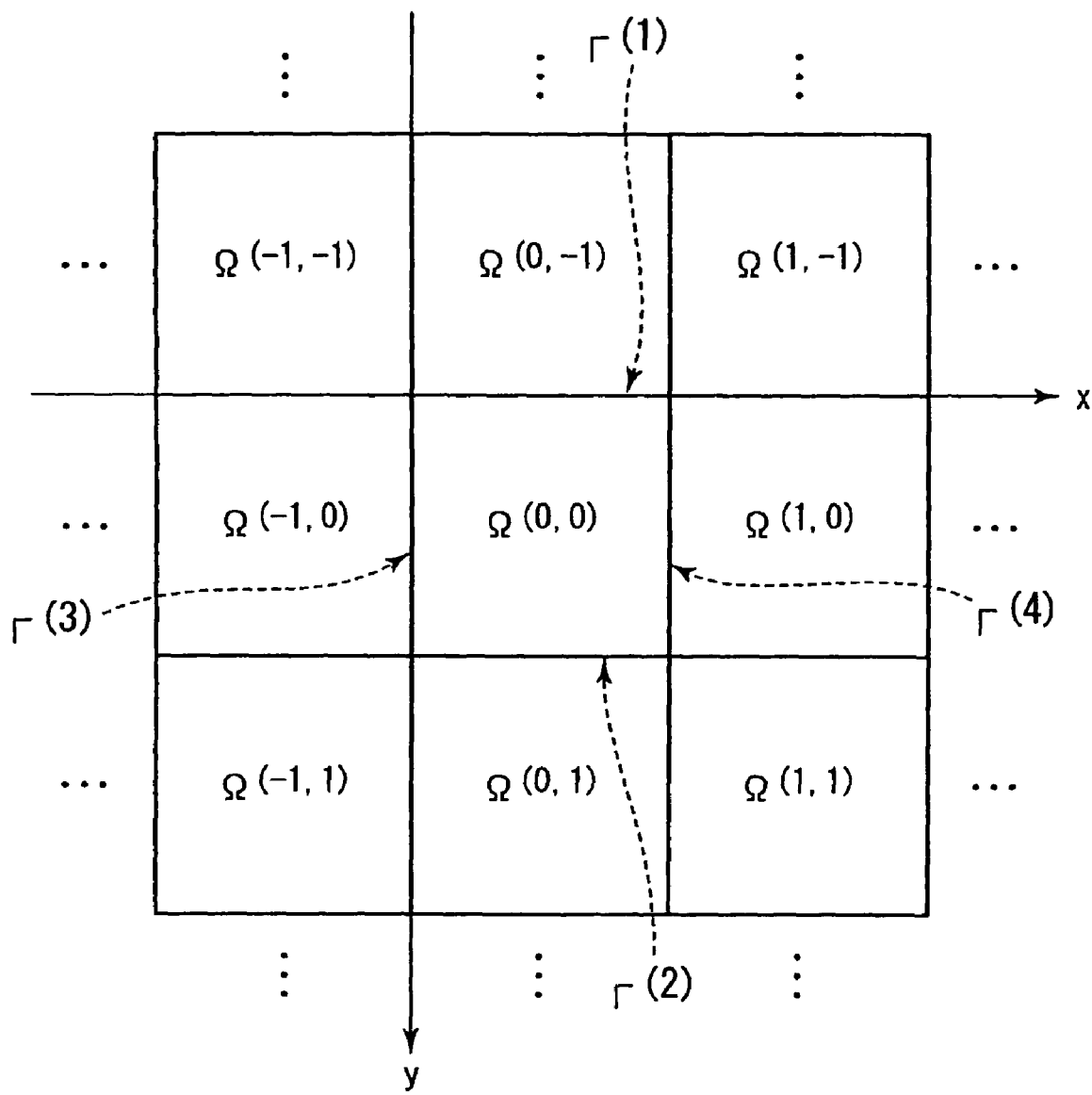
FIG. 20 is a schematic illustration of each picture divided into several rectangular zones.

A video signal of a moving-picture frame with blocks shown in FIG. 20 and expressed by an expression (1) is given to an input moving-picture frame.

$$\Omega^{(s,t)} := \{f_{i,j}^{s,t} := f(x_i + s, y_j + t), i,j = 0, 1, \ldots, N-1\} \quad (1)$$

Suppose that $\Omega^{(0,0)}$ in FIG. 20 is a block to be processed currently. Each pixel in respective blocks is expressed by an expression (2).

$$\begin{aligned} x_i &= (0.5+i)/N \\ y_j &= (0.5+j)/N \end{aligned}, \quad i, j = 0, 1, \ldots, N-1 \quad (2)$$

A gradient of a video signal, or a boundary condition, is expressed with DCT series so that it can be treated in the frequency domain. Here, a gradient "g" of a video signal is expressed with DCT series, such as $G_k$ in an expression (3) for use in expansion of DCT series of a boundary condition.

$$g^{(1)}(t) := \sqrt{\frac{2}{N}} \sum_{k=0}^{N-1} \lambda_k G_k^{(1)} \cos \pi k t = \qquad (3)$$

$$\sqrt{\frac{2}{N}} \left( \frac{G_0^{(1)}}{\sqrt{2}} + \sum_{k=1}^{N-1} G_k^{(1)} \cos \pi k t \right)$$

Obtained next is an estimated signal in a block to an original signal with the concept of Poisson's Equation. Poisson's Equation gives an expression (4) between a source term Kj and Δuj that is Laplacian of an estimated signal "u" in a block Qj to be processed.

$$\Delta uj = Kj \qquad (4)$$

The estimated signal "u" in a block can be expressed as an expression (5) with Neumann's boundary condition and DCT series representation, which is given by addition of DCT-series expanded components of the estimated signal from each border, as indicated by an expression (6).

$$u(x, y) = u^{(1)}(x, y) + u^{(2)}(x, y) + u^{(3)}(x, y) + u^{(4)}(x, y)$$

$$= \sqrt{\frac{2}{N}} \sum_{k=1}^{N-1} \lambda_k \{(G_k^{(1)} \psi_k(y-1) + G_k^{(2)} \psi_k(y)) \cos \pi k x +$$

$$(G_k^{(3)} \psi_k(x)) \cos \pi k y\} + C,$$

in which C is a constant, and $$\psi_k(t) = \begin{cases} \dfrac{t^2}{2} & \cdots k = 0 \\ \dfrac{\cosh \pi k t}{\pi k \sinh \pi k} & \cdots k \neq 0 \end{cases} \qquad (5)$$

$$u^{(1)}(x, y) := \sqrt{\frac{2}{N}} \left( \frac{G_0^{(1)}}{\sqrt{2}} \frac{(y-1)^2}{2} + \right. \qquad (6)$$

$$\left. \sum_{k=1}^{N-1} G_k^{(1)} \frac{\cosh \pi k (y-1)}{\pi k \sinh \pi k} \cos \pi k x \right)$$

The zone-border motion compensator 119 in the first embodiment obtains a predictive signal (an estimated signal) with u(x, y) according to the expression (5). This predictive signal (estimated signal) generation method is just an example, and hence the present invention is not limited to this generation method. In other words, u(x, y) can be obtained by any higher-speed calculation method that satisfies Δuj=Kj.

Figure 2:
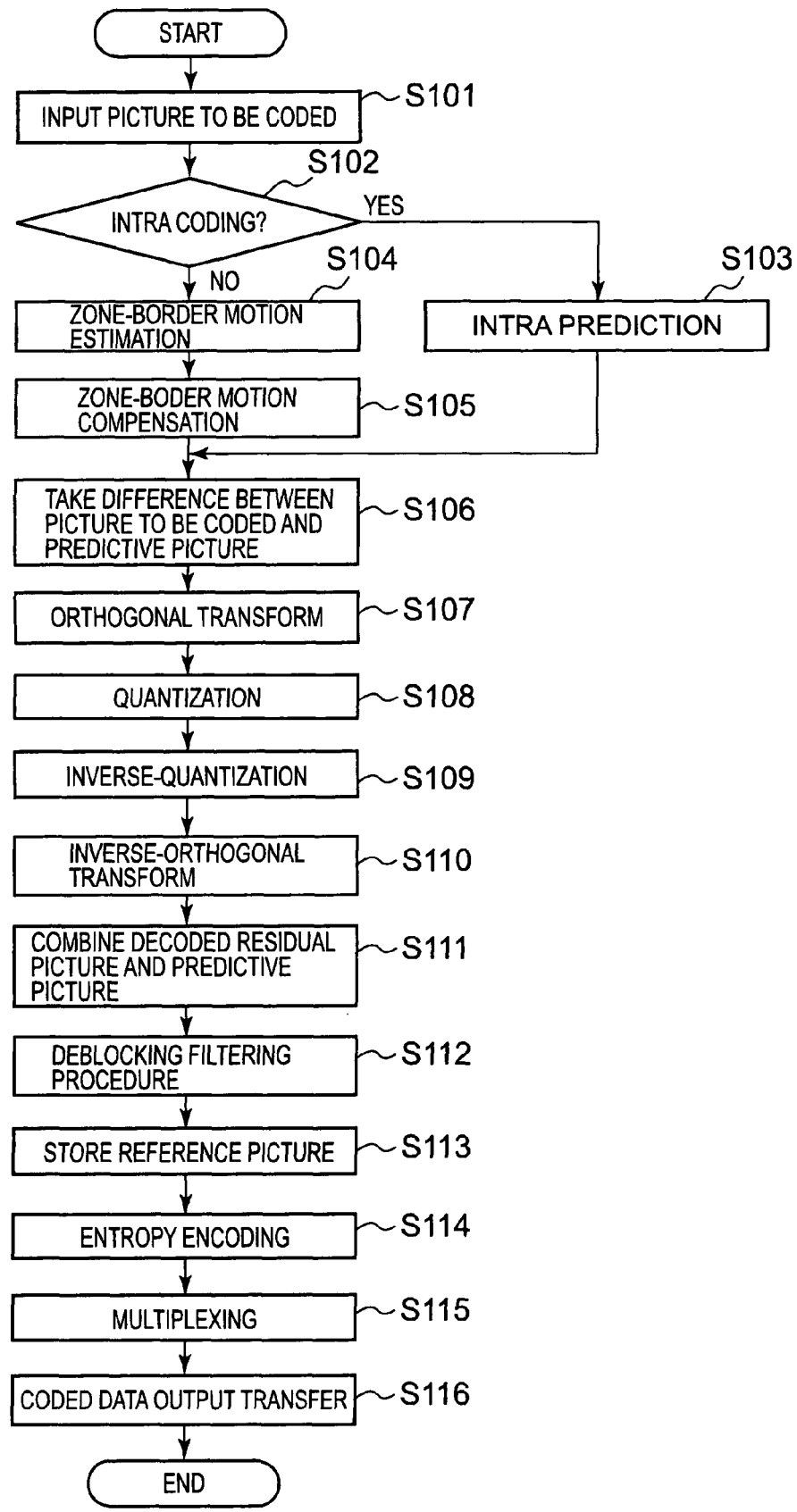
FIG. 2 is a flowchart for explaining an operation of the first embodiment of the moving-picture coding apparatus according to the present invention.

Disclosed next with reference to a flowchart in FIG. 2 is an operation of the first embodiment of the moving-picture coding apparatus according to the present invention.

A picture to be coded is input as the input signal 101, which is a frame or a field to be coded of a moving picture (step S101).

The coding controller 117 then determines whether the current coding mode in the coding apparatus is intra coding or not (step S102).

If intra coding (YES in step S102), the coding controller 117 supplies the parameter data required for intra coding to the respective component parts of the coding apparatus, and turns the switch 102 to the terminal "b" and the switch 103 to the terminal "b" for intra coding, which is followed by intra prediction at the intra predictor 105 (step S103). Then, the procedure moves to step S106.

On the contrary, If not intra coding (NO in step S102), the coding controller 117 supplies the parameter data required for inter coding to the respective component parts of the coding apparatus, and turns the switch 102 to the terminal "a" and the switch 103 to the terminal "a" for inter coding. Then, the zone-border motion estimator 118 receives the picture to be coded input as the input signal 101 and a reference picture stored in the frame memory 104, to perform the zone-border motion estimation discussed above (step S104), thus generating border motion-vector data. The generated border motion-vector data is supplied to the zone-border motion compensator 119 and the entropy encoder 113.

The zone-border motion compensator 119 receives the border motion-vector data from the zone-border motion estimator 118 and the reference picture from the frame memory 104, to perform the zone-border motion compensation discussed above (step S104), thus producing the first predictive picture. The first predictive picture is supplied to the terminal "a" of the switch 103 and the first subtractor 120. Then, the procedure moves to step S106.

After a predictive picture is produced at the intra predictor 105 or the zone-border motion compensator 119, a difference is taken between the picture to be coded and the predictive picture (step S106), thus producing a residual picture.

When the coding mode is intra coding (YES in step S102), the second subtractor 106 receives the picture to be coded, the input signal 101, and the fourth predictive picture produced by the intra predictor 105, and takes a difference (subtraction) between the picture to be coded and the fourth predictive picture, to produce the second residual picture which is then supplied to the terminal "b" of the switch 2.

When the coding mode is inter coding (NO in step S102), the first subtractor 120 receives the picture to be coded, the input signal 101, and the first predictive picture produced by the zone-border motion compensator 119, and takes a difference (subtraction) between the picture to be coded and the first predictive picture, to produce the first residual picture which is then supplied to the terminal "a" of the switch 102.

When the first or the second residual picture is produced, the orthogonal transformer 107 receives the residual picture from the switch 102 and performs orthogonal transform to the residual picture (step S107). The orthogonal transform is DCT in MPEG-1, MPEG-2 or MPEG-4 whereas integer DCT and Hadamard transform in AVC. DCT is orthogonal transform to discretely transform cosine-based integral transform into finite space. In MPEG-1, MPEG-2 or MPEG-4, two-dimensional DCT is performed to a DCT block of 8 pixels in the horizontal direction and 8 pixels in the vertical direction, a specific rectangular zone divided into 4 from a macroblock. In AVC, two-dimensional integer DCT and Hadamard transform DCT are performed to a block of 4 pixels in the horizontal direction and 4 pixels in the vertical direction. Since a video signal generally has many low-frequency components but few high-frequency components, DCT to the video signal makes coefficients converge to the low-frequency components, which efficiently suppressing the code amount at the subsequent processing at the quantizer 108. The procedure generates orthogonal-transform coefficients data (here, DCT coefficients data) which are then supplied to the quantizer 108.

The quantizer 108 quantizes the DCT coefficients data based on a specific quantization parameter (step S108). The quantization is performed by dividing the DCT coefficients by quantization values which consists of a quantization matrix and values obtained by multiplying the quantization matrix by a quantization scale for scalar multiplication of the entire matrix. In MPEG-1, MPEG-2 or MPEG-4, a quantization matrix has values of two-dimensional frequency, of 8 pixels in the horizontal direction and 8 pixels in the vertical direction, weighed by visual characteristics. In AVC, a quantization matrix has values of two-dimensional frequency, of 4 pixels in the horizontal direction and 4 pixels in the vertical direction, weighed by visual characteristics. In inverse-quantization at decoder, multiplication with the quantization values gives values similar to the original DCT coefficients. Accordingly, post-quantization data are generated and supplied to the inverse-quantizer 109 and the entropy encoder 113.

The inverse-quantizer 109 performs inverse-quantization to the post-quantization data (step S109) based on a specific quantization parameter (step S109). Accordingly, post-inverse-quantization data are generated and supplied to the inverse-orthogonal transformer 110. The inverse-orthogonal transformer 110 performs inverse-orthogonal transform to the post-inverse-quantization data (step S110). Accordingly, a decoded residual picture is produced and supplied to the first combiner 111.

The first combiner 111 receives the decoded residual picture from the inverse-orthogonal transformer 110 and the first or the fourth predictive picture from the switch 103 and combines the decoded residual picture and the predictive picture (step S111). Accordingly, a decoded picture is produced and supplied to the deblocking filter 112. The decoded picture is also supplied to the intra predictor 105 when the encoding mode is intra coding.

The deblocking filter 112 receives the decoded picture from the first combiner 111 and performs a deblocking filtering procedure (step S112). The decoded picture thus deblocking-filtered is then stored in the frame memory 104 as a reference picture for the succeeding coding.

Thereafter, in order to output a string of post-encoding data, the entropy encoder 113 receives at least the post-quantization data from the quantizer 108 and the border motion-vector data from the zone-border motion estimator 118 and performs entropy coding (step S114), thus generating coded bit strings. The entropy encoder 113 may also perform entropy coding to several types of parameter data used in encoding received from the respective component parts of the coding apparatus. The generated coded bit strings are supplied to the multiplexer 114. Entropy coding is typically VLC (Variable Length Coding) to perform variable length coding to quantized data. Performed in variable length coding is Huffman coding with zigzag scanning of DCT coefficients from low to high ranges and allocating a shorter code to an event of zero-run length and an effective coefficient value with higher probability. The entropy encoder 113 may perform arithmetic coding, instead of Huffman coding, for higher data compression. AVC employs CAVLC (Context-Adaptive Variable Length Coding) and CABAC (Context-Adaptive Binary Arithmetic Coding) in entropy coding for higher efficiency.

The multiplexer 114 receives the bit strings from the entropy encoder 113 and multiplexes them based on the specific syntactic structure (step S115), thus generating a coded bitstream. The bitstream (multiplexed bitstream) is then supplied to the output transferer 115. The multiplexed bitstream is subjected to a packetization procedure and other procedures, if any, at the output transferer 115 and output as the output signal 116.

The procedures from step S101 to S116 are performed to complete a coding procedure for a picture to be coded at a certain moment at the coding apparatus in the first embodiment.

The output signal 116 output as described above is delivered as a coded bitstream through transfer via a storage medium, a network, etc., and reproduced at a terminal. In reproduction at a terminal, the delivered coded bitstream is reproduced after decoded by a decoder of the terminal.

Accordingly, in the moving-picture coding apparatus and method of the first embodiment, the zone-border motion estimator 118 and the zone-border motion compensator 119 perform the zone-border motion estimation and zone-border motion compensation, discussed above. Thus, the apparatus and method achieve production of predictive pictures that are smoother on block borders than those produced by known art with smooth filtering to predictive pictures produced through motion estimation and compensation with block matching, and hence achieve production of high-quality residual pictures, which leads to higher coding efficiency.

Moreover, according to the moving-picture coding apparatus and method of the first embodiment, motion-vector search is performed on each side of a rectangular zone to the gradient of a video signal that is a boundary condition for each side of the rectangular zone, to generate motion-vector data on each border. This procedure enables production of predictive pictures of higher quality than known motion compensation, based on the gradient of a video signal determined by respective border motion-vector data corresponding to respective sides of a rectangular zone, thus enhancing coding efficiency.

Figure 3:
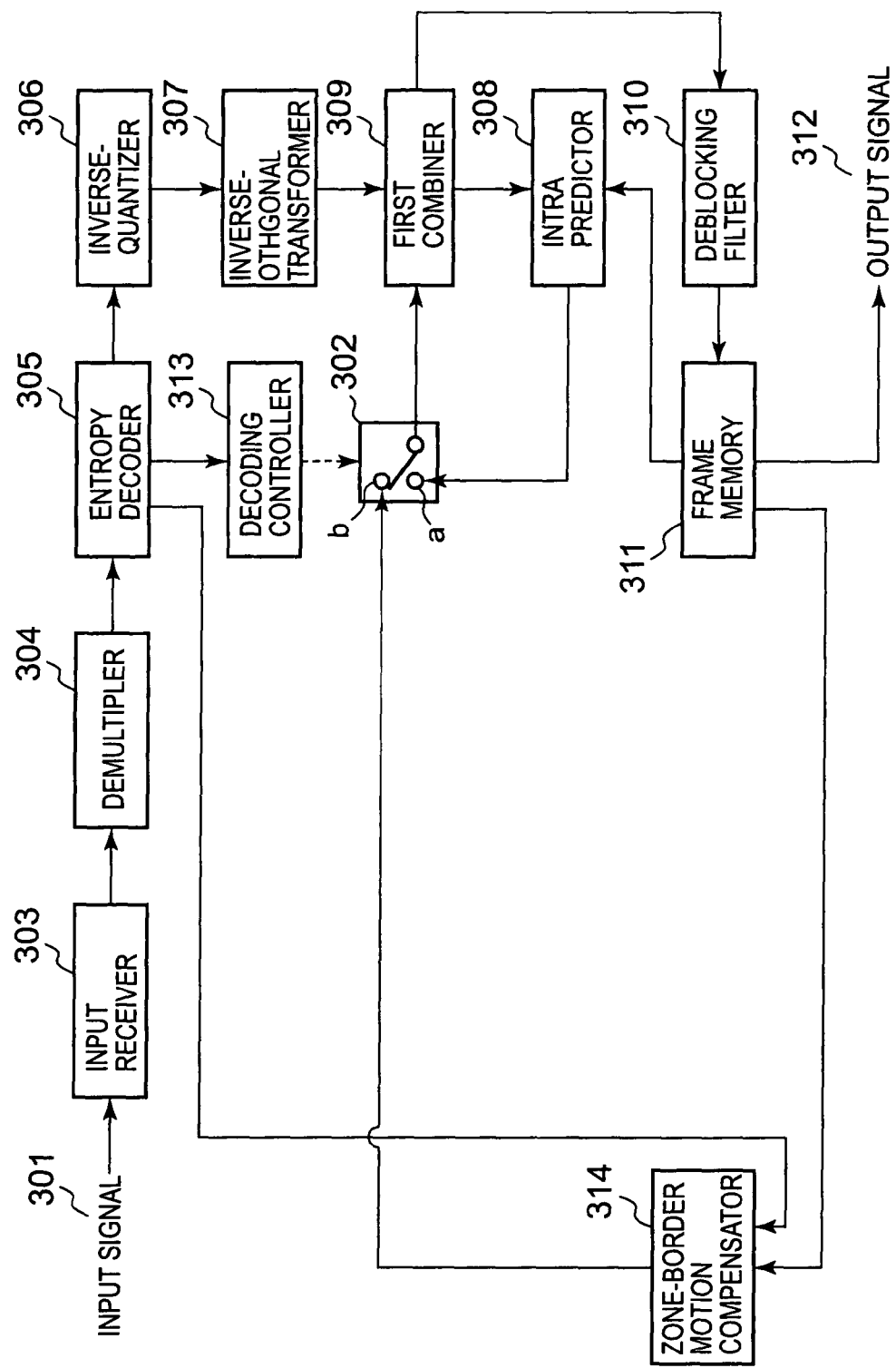
FIG. 3 is a block diagram of a first embodiment of a moving-picture decoding apparatus according to the present invention.
Figure 4:
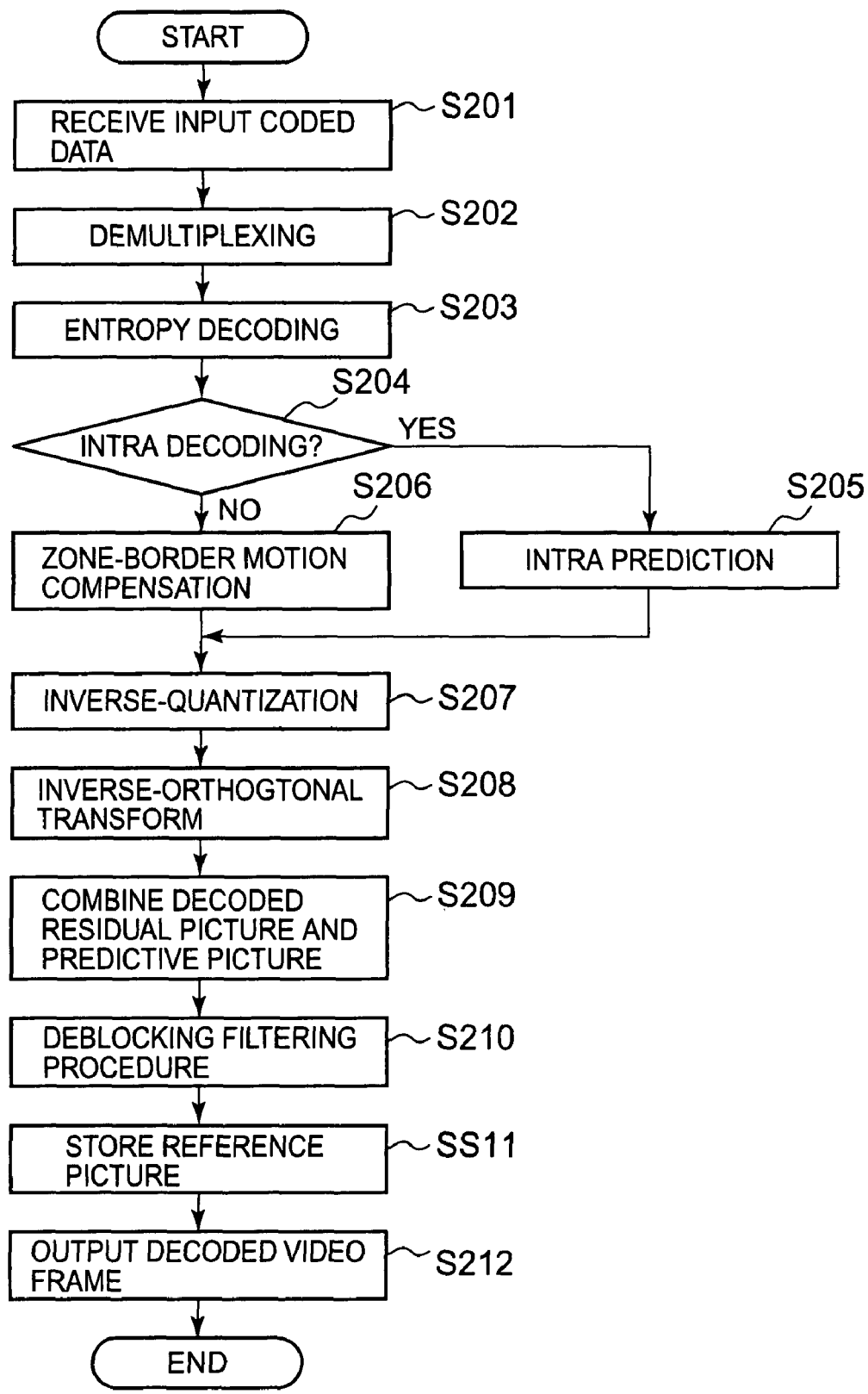
FIG. 4 is a flowchart for explaining an operation of the first embodiment of the moving-picture decoding apparatus according to the present invention.

Disclosed next with reference to FIGS. 3 and 4 is the first embodiment of the moving-picture decoding apparatus that receives and decodes a coded bitstream generated by the first embodiment of the moving-picture coding apparatus of the present invention or a computer that runs on a first coding program that achieves this embodiment of the moving-picture coding apparatus with software which will be described later.

FIG. 3 shows a block diagram of the first embodiment of the moving-picture decoding apparatus according to the present invention. As shown in FIG. 3, the decoding apparatus in this embodiment is equipped at least with a switch 302, an input receiver 303, a demultiplexer 304, an entropy decoder 305, an inverse-quantizer 306, an inverse-orthogonal transformer 307, a first combiner 309, a frame memory 311, a decoding controller 313, and a zone-border motion compensator 314. Moreover, it is preferable for the decoding apparatus to be equipped with an intra predictor 308 and a deblocking filter 310, as shown in FIG. 3.

The switch 302 switches a picture between a fourth predictive picture sent to a terminal "a" from the intra predictor 308 and a first predictive picture sent to a terminal "b" from the zone-border motion compensator 314, in response to an instruction from the decoding controller 313, to supply the selected predictive picture to the first combiner 309.

The input receiver 303 performs a packetization procedure to a coded bitstream (an input signal 301) supplied via a transfer line or a storage medium (either not shown), to obtain packet data. Moreover, the input receiver 303 performs a packet combining procedure to the packet data to generate a coded bitstream which is then supplied to the demultiplexer 304.

The demultiplexer 304 demultiplexes the coded bitstream based on a specific syntactic structure to generate coded bit strings which are then supplied to the entropy decoder 305.

The entropy decoder 305 performs entropy decoding to the coded bit strings to obtain at least post-quantization data and border motion-vector data. Here, it is preferable for the entropy decoder 305 to obtain other parameter data, for example, required for constructing a specific syntactic structure, by entropy decoding to the coded bit strings. Entropy decoding is typically inverse-VLC for variable length coding to demultiplexed data. When AVC is employed, variable length coding is performed with inverse-AVLC or -CABAC.

The parameter data required for constructing such a specific syntactic structure may preferably include macroblock data indicating kinds of state of a macroblock, quantization parameter data for use in quantization and inverse-quantization, intra-mode data for specifying a mode of intra prediction, frame-order data for specifying the order of referring to reference video frames, etc.

The post-quantization data and the border motion-vector data are supplied from the entropy decoder 305 to the inverse-quantizer 306 and the zone-border motion compensator 314, respectively.

The inverse-quantizer 306 performs inverse-quantization to the post-quantization data based on a specific quantization parameter to generate post-inverse-quantization data which are then supplied to the inverse-orthogonal transformer 307. The inverse-orthogonal transformer 307 performs inverse-orthogonal transform to the post-inverse-quantization data to produce a decoded residual picture. The inverse-orthogonal transform is IDCT (Inverse-Discrete Cosine Transform) in MPEG-1, MPEG-2 or MPEG-4. In AVC, integer IDCT and Hadamard transform are used.

The first combiner 309 receives the decoded residual picture from the inverse-orthogonal transformer 307 and the predictive picture from the switch 302. It combines the decoded residual picture and the predictive picture to produce a decoded picture which is then supplied to the intra predictor 308 and the deblocking filter 310.

The frame memory 311 receives a decoded picture from respective component parts of the decoding apparatus to store it as a reference picture. In FIG. 3, the frame memory 311 receives a decoded picture from the deblocking filter 310 after deblocking filtering. The frame memory 311 supplies a required reference picture to any component parts of the decoding apparatus. In FIG. 3, the reference picture is supplied from the frame memory 311 to the intra predictor 308 and the zone-border motion compensator 314. Moreover, the frame memory 311 outputs the decoded picture as an output signal according to need by a display apparatus (not shown).

The decoding controller 313 supplies, at least, several types of parameter data required for decoding to the respective component parts of the decoding apparatus in control of the operation of the decoding apparatus in this embodiment, controls input/output of the component parts, and controls the switch 302 (connection for supplying the parameter data is omitted from FIG. 3).

The zone-border motion compensator 314 receives the border motion-vector data from the entropy decoder 305 and the reference picture from the frame memory 311. It performs zone-border motion compensation to determine a gradient of a video signal in each side of a block, required for producing an estimated signal in block, based on the border motion-vector data, apply the gradient thus found to Poisson's Equation to generate a predictive signal in block that is a predictive signal per block in a picture, thus producing a first predictive picture. The produced first predictive picture is supplied to a terminal "b" of the switch 302.

The intra predictor 308 receives the decoded picture from the first combiner 309 and produces a fourth predictive picture through intra prediction. A picture to be used in intra prediction may be sent from the frame memory 311. The produced fourth predictive picture is supplied to a terminal "a" of the switch 302.

The deblocking filter 310 receives the decoded picture from the first combiner 309 and, after performing a deblocking filtering procedure, supplies the decoded picture thus deblocking-filtered to the frame memory 311.

Disclosed next with reference to a flowchart in FIG. 4 is an operation of the first embodiment of the moving-picture decoding apparatus shown in FIG. 3.

The input receiver 303 receives coded data by sequentially receiving specific packet data as the input signal 301 via a transfer line or a storage medium (step S201). Moreover, the input receiver 303 performs a packet combining procedure to the packet data to reconstruct a coded bitstream which is then supplied to the demultiplexer 304.

The demultiplexer 304 performs demultiplexing of the coded data from the coded bitstream based on a specific syntactic structure (step S202), and supplies coded bit strings, post-demultiplex data, to the entropy decoder 305.

The entropy decoder 305 performs entropy decoding to the coded bit strings (step S203) to obtain post-quantization data, border motion-vector data, and other parameter data, for example, required for constructing a specific syntactic structure. The post-quantization data and the border motion-vector data are supplied to the inverse-quantizer 306 and the zone-border motion compensator 314, respectively.

The decoding controller 313 then determines whether the current decoding mode in the decoding apparatus is intra decoding or not (step S204). If intra decoding (YES in step S204), the decoding controller 313 supplies the parameter data required for intra decoding to the respective component parts of the decoding apparatus. Moreover, the decoding controller 313 turns the switch 302 to the terminal "a" for intra decoding, which is followed by intra prediction at the intra predictor 308 (step S205). Then, the procedure moves to step S207.

On the contrary, if not intra decoding (NO in step S204), the decoding controller 313 supplies the parameter data required for inter decoding to the respective component parts of the decoding apparatus. Moreover, the decoding controller 313 turns the switch 302 to the terminal "b" for inter decoding. Then, the zone-border motion compensator 314 receives the border motion-vector data from the entropy decoder 305 and the corresponding reference picture from the frame memory 311, to perform zone-border motion compensation (step S206), thus producing the first predictive picture. The produced first predictive picture is supplied to the terminal "b" of the switch 302. Then, the procedure moves to step S207.

The inverse-quantizer 306 receives the post-quantization data from the entropy decoder 305 and performs inverse-quantization to the data based on a specific quantization parameter (step S207), to generate post-inverse-quantization data which are then supplied to the inverse-orthogonal transformer 307.

The inverse-orthogonal transformer 307 performs inverse-orthogonal transform to the post-inverse-quantization data (step S208), to produce a decoded residual picture which is supplied to the first combiner 309. The first combiner 309 combines the decoded residual picture and the predictive picture from the switch 302 to produce a decoded picture (step S209). The produced decoded picture is supplied to the deblocking filter 310. The decoded picture is also supplied to the intra predictor 308 when the decoding mode is intra decoding.

The deblocking filter 310 receives the decoded picture from the first combiner 309 and performs a deblocking filtering procedure (step S210). Produced here is a deblocking-filtered decoded picture which is then stored in the frame memory 311 as a reference picture for the succeeding coding (step S211).

The frame memory 311 receives and stores the deblocking-filtered decoded picture as a reference picture and supplies the reference picture to the intra predictor 308 and the zone-border motion compensator 314 in need. It is preferable for the frame memory 311 to store at least one or more of reference pictures and supply a required reference picture to any component parts of the decoding apparatus. Moreover, the frame memory 311 outputs a decoded video frame at a display timing for a decoded picture (step S212). The decoded video frame is output to an external display apparatus (not shown) as an output signal 312 necessary for displaying.

Thereafter, if there is another coded bitstream to be decoded and decoding is necessary, the procedure returns to step S201 to continue the decoding procedure whereas if decoding is not necessary, the decoding procedure is finished.

Accordingly, in the moving-picture decoding apparatus and method of the first embodiment, decoding is performed after the zone-border motion compensator 314 performs zone-border motion compensation to the input signal that is a coded bitstream subjected to the zone-border motion estimation and zone-border motion compensation, discussed above, with coding parameters and border motion-vector data. Therefore, the moving-picture decoding apparatus and method of the first embodiment can correctly decode a bitstream coded with a residual signal (picture) obtained by means of an estimated signal based on a block-border boundary condition through zone-border motion estimation and zone-border motion compensation, thus producing high-quality decoded videos with a fewer code amount overall.

Embodiment II

Disclosed next are second embodiments of a moving-picture coding apparatus and a moving-picture decoding apparatus according to the present invention.

Figure 5:
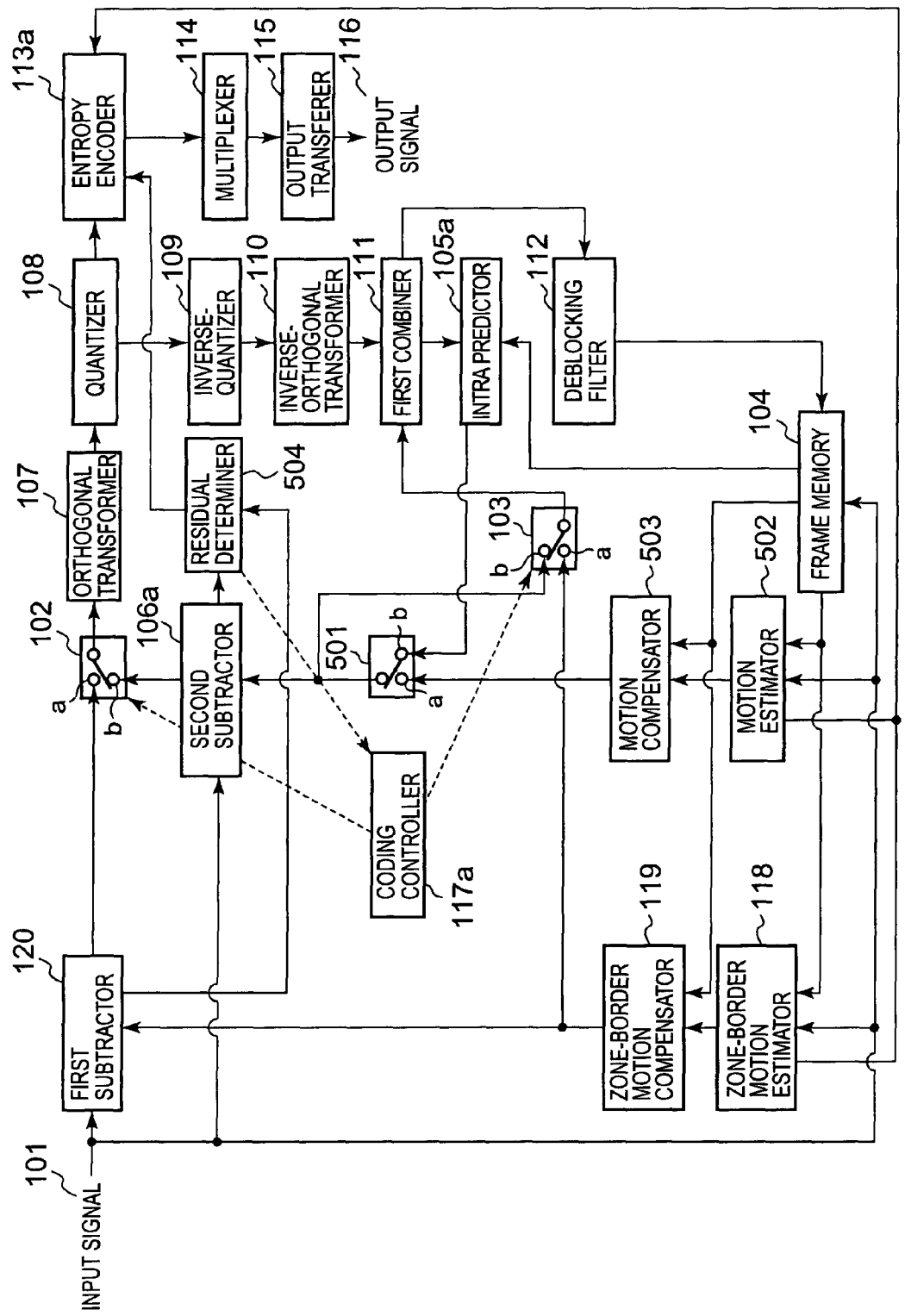
FIG. 5 is a block diagram of a second embodiment of a moving-picture coding apparatus according to the present invention.

FIG. 5 shows a block diagram of the second embodiment of the moving-picture coding apparatus according to the present invention. In the figure, the component parts analogous to those in FIG. 1 are given the same reference numerals, with detailed explanation thereof being omitted. In addition to the component parts analogous to those of the moving-picture coding apparatus of FIG. 1, the moving-picture coding apparatus in this embodiment is equipped a switch 501, a motion estimator 502, a motion compensator 503, and a residual determiner 504, for motion estimation and compensation in H. 264/AVC.

There are three prediction modes in AVC: intra predictive coding, forward predictive coding, and bidirectional predictive coding.

In intra predictive coding, orthogonal transform is performed at the orthogonal transformer 107, after utilizing intra data and intra-based predictive data at the intra predictor 105a, without the output of the motion compensator 503. A picture coded in this mode is referred to as an I picture. The I picture can be decoded without relying on other pictures in decoding. A single I picture can include several slices in AVC. Nevertheless, in the following description, it is defined that a single I picture consists of one slice, for expediency.

In forward predictive coding, an already coded picture is motion compensated at the motion compensator 503 for coding of a picture to be coded currently. Difference is taken between a predictive picture produced in this prediction and a picture to be coded as an input signal 101 to produce a residual picture which is then subjected to orthogonal transform at the orthogonal transformer 107. Orthogonal transform at the orthogonal transformer 107 is DCT (Discrete Cosine Transform) in MPEG-1, MPEG-2 or MPEG-4. The orthogonal transform can be performed with another transform basis such as Hadamard or wavelet basis. In AVC, integer DCT and Hadamard transform are used for orthogonal transform. A picture coded in the forward predictive mode is referred to as a P picture. The P picture relies on other pictures, and hence cannot be decoded independently like the I picture, notwithstanding, can be compressed at a lower bit rate than the I picture.

In bidirectional predictive coding, prediction is performed to a picture to be coded currently, with motion compensation of any two directions (ordinarily two pictures), not only bidirectional of past and future at the motion compensator 503. Difference is taken between a predictive picture produced in this prediction and a picture to be coded as an input signal 101 to produce a residual picture which is then subjected to orthogonal transform at the orthogonal transformer 107. A picture coded in the bidirectional predictive mode is referred to as a B picture. The B picture relies on other past or future pictures, and hence cannot be decoded independently like the I picture, notwithstanding, can be compressed at a further lower bit rate than the I and B pictures.

Each frame and slice is subjected to a prediction procedure per macroblock of 16 pixels in the horizontal direction and 16 pixels in the vertical direction. It may be divided further into smaller blocks or subblocks for a prediction procedure. It is defined that a prediction procedure is performed for each block of 8 pixels in the horizontal direction and 8 pixels in the vertical direction, in the following description, for expediency.

The direction of prediction is different among the I, P or B pictures. The I picture is subjected to coding independently for all macroblocks. The P picture is subjected to two coding modes: coding with prediction from a past picture; and coding a macroblock independently with no prediction. The B picture is subjected to four coding modes: coding with prediction from future; coding with prediction from past; coding with prediction from future and past; and coding a macroblock independently with no prediction.

Motion estimation is performed at the motion estimator 502 with block matching at ½-pixel or ¼-pixel accuracy to each block of a picture to be coded, to find out a zone with the smallest error in a reference picture, thus generating motion data. Here, the motion data consists of at least vector data, obtained by pattern matching, for specifying a spatial position to a zone corresponding to each block, and reference-picture data for specifying a reference picture. Motion compensation is performed at the motion compensator 503 to produce a predictive picture from the reference picture, based on the motion data estimated by the motion estimator 502.

The switch 501 is provided with a fourth predictive picture produced by the intra predictor 105a at a terminal "b" and a second predictive picture produced by the motion compensator 503 at a terminal "a". The switch 501 selects either one of the second and fourth predictive pictures under control by a coding controller 117a and supplied the selected predictive picture to the terminal "b" of the switch 103 and a second subtractor 106a. The motion estimator 502 receives a picture to be coded of a moving picture as the input signal 101 and also the corresponding reference picture from the frame memory 104 and performs motion estimation to generate motion-vector data. The motion estimation, like ordinary motion estimation such as AVC, conducts motion-vector search in the reference picture through block matching with respect to each zone in the picture to be coded, to generate motion-vector data that indicates a matched block zone. Then, the motion estimator 502 supplies the generated motion-vector data to the motion compensator 503 and an entropy encoder 113a. The motion compensator 503 receives the motion-vector data from the motion estimator 502 and the corresponding reference picture from the frame memory 104. Then, the motion compensator 503 finds out the corresponding block zone in the reference picture based on the motion-vector data to produce a second predictive picture which is then supplied to the terminal "a" of the switch 501.

The residual determiner 504 receives a second residual picture produced by taking a difference between a second or a fourth predictive picture and a picture to be coded (the input picture 101) at the second subtractor 106a, and also receives a first residual picture produced by taking a difference between a first predictive picture and the picture to be coded (the input picture 101) at the first subtractor 120. Moreover, the residual determiner 504 receives border motion-vector data from the zone-border motion estimator 118 and motion-vector data from the motion estimator 502.

Then, the residual determiner 504 determines as to whether to employ the first residual picture from the first subtractor 120 or the second residual picture from the second subtractor 106a, based on specific determination criteria. Under feasible determination criteria, the coded amount of the received first and second residual pictures are compared and the residual picture of a smaller coded amount is selected. Under more feasible determination criteria, the coded amount of the first residual picture and motion-vector data, and the coded amount of the second residual picture and motion-vector data are compared and the residual picture of a smaller coded amount is selected. The residual determiner 504 then supplies residual determination data indicating which of the first or the second residual picture is selected to a coding controller 117a and an entropy encoder 113a.

The coding controller 117a controls switching at the switch 102 based on the residual determination data supplied from the residual determiner 504, for switching control of the residual picture to be supplied to an orthogonal transformer 107, in addition to the functions of the coding controller 117 in FIG. 1. Moreover, the coding controller 117a controls switching at the switch 103 based on the residual determination data, for switching control of the predictive picture, used for producing the residual picture thus selected, to be supplied to a first combiner 111. Furthermore, the coding controller 117a controls switching at the switch 501 according to the coding mode.

The intra predictor 105a supplies a produced fourth picture to a terminal "b" of the switch 501. The signal selected by the switch 501 is supplied to the terminal "b" of the switch 103. The second subtractor 106a receives a picture to be coded of a moving picture, the input signal 101, and the second predictive picture or the fourth predictive picture from the switch 501. The second predictive picture is a picture produced by the motion compensator 503. The fourth predictive picture is a picture produced by the intra predictor 105a. The second subtractor 106a performs calculation of difference between the picture to be coded and the second or the fourth predictive picture to produce a second residual picture which is then supplied to the terminal "b" of the switch 102 and the residual determiner 504.

The entropy encoder 113a receives the motion-vector data from the motion estimator 502 and the residual determination data from the residual determiner 504, for entropy encoding, in addition to the functions of the entropy encoder 113 in FIG. 1.

Figure 6:
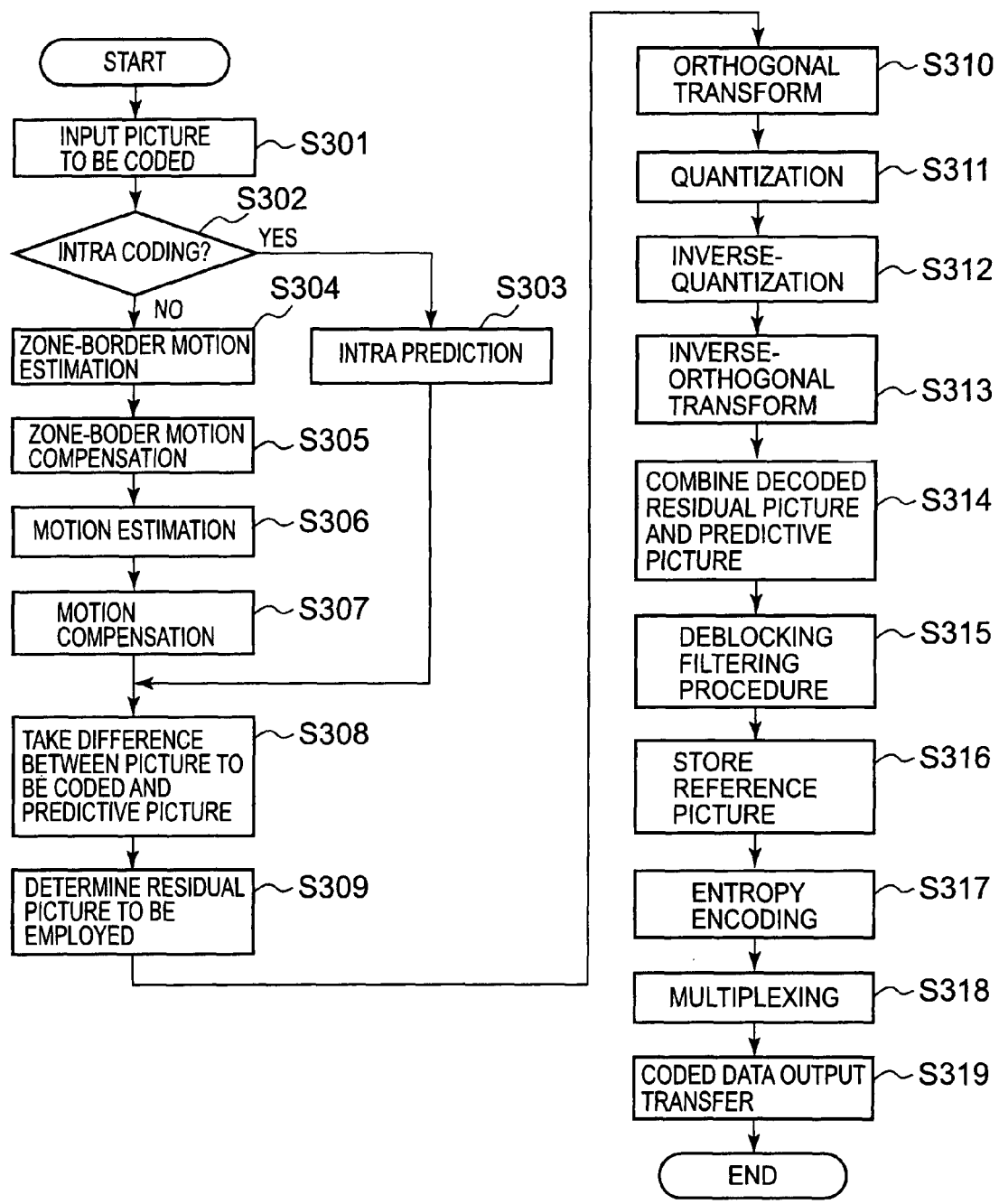
FIG. 6 is a flowchart for explaining an operation of the second embodiment of the moving-picture coding apparatus according to the present invention.

Disclosed next with reference to a flowchart in FIG. 6 is an operation of the second embodiment of the moving-picture coding apparatus shown in FIG. 5.

A picture to be coded is input as the input signal 101, which is a frame or a field to be coded of a moving picture (step S301). The coding controller 117a then determines whether the current coding mode in the coding apparatus is intra coding or not (step S302).

If intra coding (YES in step S302), the coding controller 117a supplies parameter data required for intra coding to the respective component parts of the coding apparatus, and turns the switch 102 to the terminal "b" and the switch 103 to the terminal "b" for intra coding, which is followed by intra prediction at the intra predictor 105a (step S303). Then, the procedure moves to step S308.

On the contrary, If not intra coding (NO in step S302), the coding controller 117a supplies parameter data required for inter coding to the respective component parts of the coding apparatus, and turns off the switches 102 and 103, and turns the switch 501 to the terminal "a" for inter coding.

Then, the zone-border motion estimator 118 receives the picture to be coded input as the input signal 101 and a reference picture stored in the frame memory 104, to perform zone-border motion estimation (step S304). Border motion-vector data thus generated is then supplied to the zone-border motion compensator 119 and the entropy encoder 113a.

The zone-border motion compensator 119 receives the border motion-vector data from the zone-border motion estimator 118 and the corresponding reference picture from the frame memory 104, to perform zone-border motion compensation (step S305). The first predictive picture thus produced is then supplied to the terminal "a" of the switch 103 and the first subtractor 120.

The motion estimator 502 receives the picture to be coded supplied as the input signal 101 and the reference picture stored in the frame memory 104, to perform motion estimation (step S306). Motion-vector data thus generated is supplied to the motion compensator 503 and the entropy encoder 113a.

The motion compensator 503 receives the motion-vector data from the motion estimator 502 and the corresponding reference picture stored in the frame memory 104, to perform motion compensation (step S307). The second predictive picture thus produced is then supplied to the terminal "a" of the switch 501. Then, the procedure moves to step S308.

After the predictive picture is produced by the intra predictor 105a or the zone-border motion compensator 119 and the motion compensator 503, calculation of difference is performed between the picture to be coded and the predictive picture (step S308) to produce a residual picture.

If intra coding (YES in step S302), the second subtractor 106a receives the picture to be coded, the input signal 101, and the fourth predictive picture produced by the intra predictor 105a via the switch 501 already turned to the terminal "b", to perform calculation of difference (subtraction) between the pictures, thus producing the second residual picture which is then supplied to the terminal "b" of the switch 102 and the residual determiner 504.

If inter coding (NO in step S302), the second subtractor 106a receives the picture to be coded, the input signal 101, and the second predictive picture produced by the motion compensator 503 via the switch 501 already turned to the terminal "a", to perform calculation of difference (subtraction) between the pictures, thus producing the second residual picture which is then supplied to the terminal "b" of the switch 102 and the residual determiner 504 (step S306 and S307).

The first subtractor 120 receives the picture to be coded, the input signal 101, and the first predictive picture produced by the zone-border motion compensator 119, to perform calculation of difference (subtraction) between the pictures, thus producing the first residual picture which is then supplied to the terminal "a" of the switch 102 and the residual determiner 504 (step S304 and S305). Either of the procedure in steps S304 and S305 and the procedure in steps S306 and S307 may be executed first or both may be executed simultaneously.

Then, the residual determiner 504 determines as to whether to employ the first residual picture from the first subtractor 120 or the second residual picture from the second subtractor 106a, based on specific determination criteria (step S309), thus selecting a residual picture to be supplied to the orthogonal transformer 107. The residual determiner 504 then supplies residual determination data indicating which of the first or the second residual picture is selected to the coding controller 117a and the entropy encoder 113a.

When the residual determination data is supplied to the coding controller 117a from the residual determiner 504, the coding controller 117a controls encoding with switching via the switches 102 and 103. When it is found from the residual determination data that the first residual picture is selected, the coding controller 117a turns the switch 102 to the terminal "a" and the switch 103 to the terminal "a". In contrast, when it is found from the residual determination data that the second switch 102 to the terminal "b" and the switch 103 to the terminal "b". Thereby, the residual picture selected via the switch 102 is supplied to the orthogonal transformer 107 and the predictive picture selected via the switch 103 is supplied to the first combiner 111.

The orthogonal transformer 107 receives the residual picture selected via the switch 102 and performs orthogonal transform (step S310). Orthogonal-transform coefficients data (here, DCT coefficients data) thus generated are supplied to the quantizer 108. The quantizer 108 quantizes the DCT coefficients data based on a specific quantization parameter (step S311). Post-quantization data thus generated are supplied to the inverse-quantizer 109 and the entropy encoder 113a.

The inverse-quantizer 109 receives the post-quantization data from the quantizer 108 and performs inverse-quantization based on a specific quantization parameter (step S312). Post-inverse-quantization data thus generated are supplied to the inverse-orthogonal transformer 110. The inverse-orthogonal transformer 110 performs inverse-orthogonal transform to the post-inverse-quantization data (step S313). A decoded residual picture thus produced is then supplied to the first combiner 111.

The first combiner 111 receives the decoded residual picture from the inverse-orthogonal transformer 110 and the predictive picture from the switch 103 and combines them (step S314), to produce a decoded picture which is then supplied to the deblocking filter 112. The decoded picture is also supplied to the intra predictor 105a when the encoding mode is intra coding.

The deblocking filter 112 receives the decoded picture from the first combiner 111 and performs a deblocking filtering procedure (step S315). The decoded picture thus deblocking-filtered is then stored in the frame memory 104 as a reference picture for the succeeding coding (step S316).

Thereafter, in order to output a string of coded data, the entropy encoder 113a receives at least the post-quantization data from the quantizer 108, the border motion-vector data from the zone-border motion estimator 118, the motion-vector data from the motion estimator 502, and the residual determination data from the residual determiner 504 and performs entropy coding (step S317), thus generating coded bit strings. The entropy encoder 113 may also perform entropy coding to several types of parameter data used in encoding received from the respective component parts of the coding apparatus. The generated coded bit strings are supplied to the multiplexer 114.

The multiplexer 114 receives the bit strings from the entropy encoder 113a and multiplexes them based on the specific syntactic structure (step S318). A coded bitstream thus generated is then supplied to the output transferer 115. The output transferer 115 receives the multiplexed bitstream and performs a packetization procedure and other procedures, if any, and then outputs coded data to a transfer line or a storage medium (step S319). The procedures from step S101 to S116 are performed to complete a coding procedure for a picture to be coded at a certain moment at the coding apparatus in this embodiment.

Accordingly, in the moving-picture coding apparatus and method of the first embodiment, the motion estimator 502 and the motion compensator 503 perform ordinary motion estimation and motion compensation to generate a predictive signal and obtain a residual signal (a residual picture) between the predictive signal and the input signal 101, and in addition, the zone-border motion estimator 118 and the zone-border motion compensator 119 perform the zone-border motion estimation and zone-border motion compensation, discussed above, like the first embodiment, to generate an estimated signal based on a boundary condition on a block border and obtain a residual signal (a residual picture) between the estimated signal and the input signal 101, followed by the residual determiner 504 to compare the data amount of the residual signal from the first subtractor 120 and that of the second subtractor 120 and select the residual signal (residual picture) of smaller data amount. Thus, according to the apparatus and method in the second embodiment, when the data amount obtained by means of an estimated signal based on a boundary condition on a block border is larger than the data amount of a predictive signal obtained by ordinary motion estimation and motion compensation, the residual signal (the residual picture) selected is the one obtained by taking a difference between predictive signal obtained by ordinary motion estimation and motion compensation and a picture to be coded, thus overall code amount becomes smaller for a higher quality coded videos and higher coding efficiency.

Figure 7:
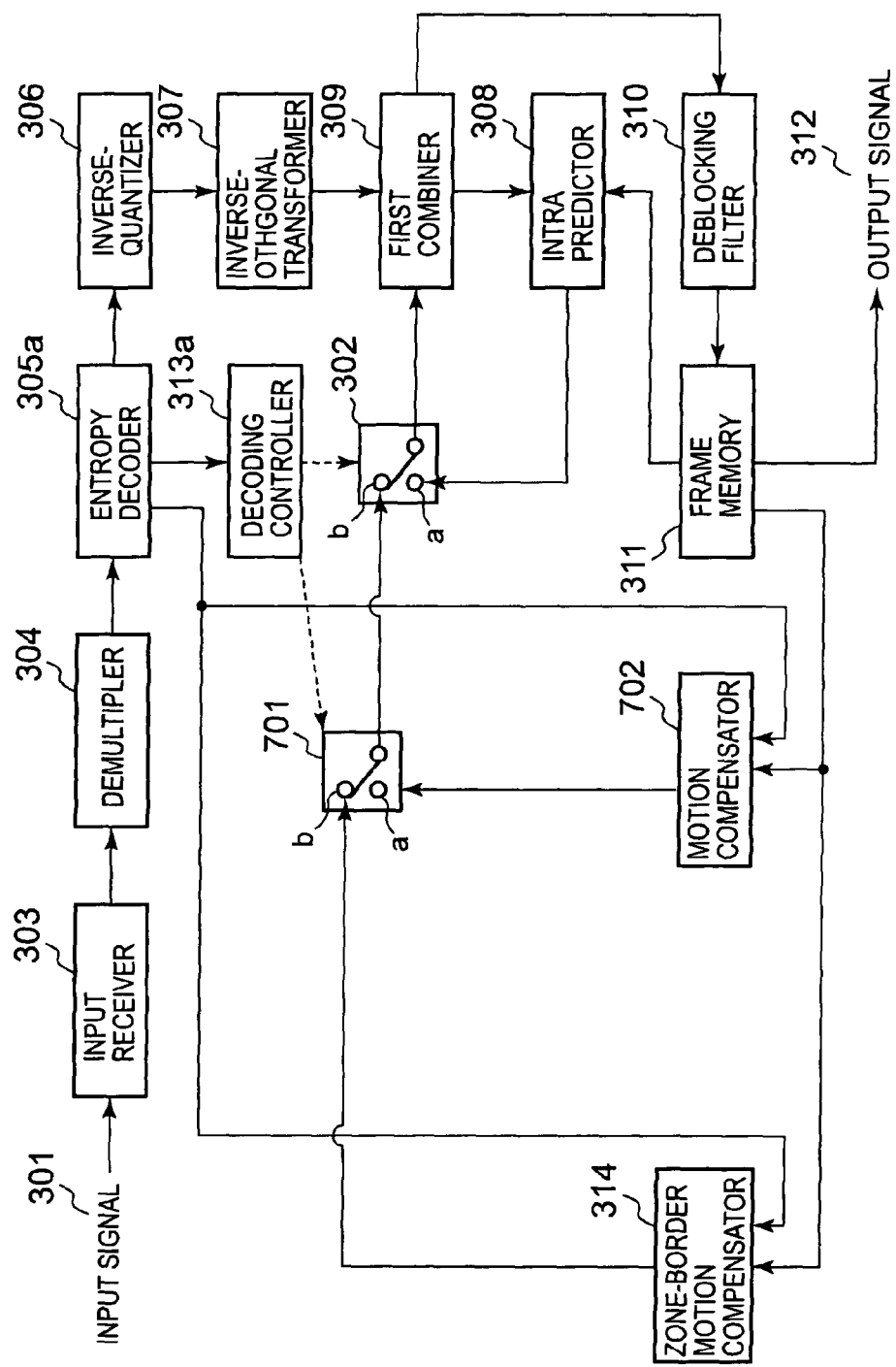
FIG. 7 is a block diagram of a second embodiment of moving-picture decoding apparatus according to the present invention.
Figure 8:
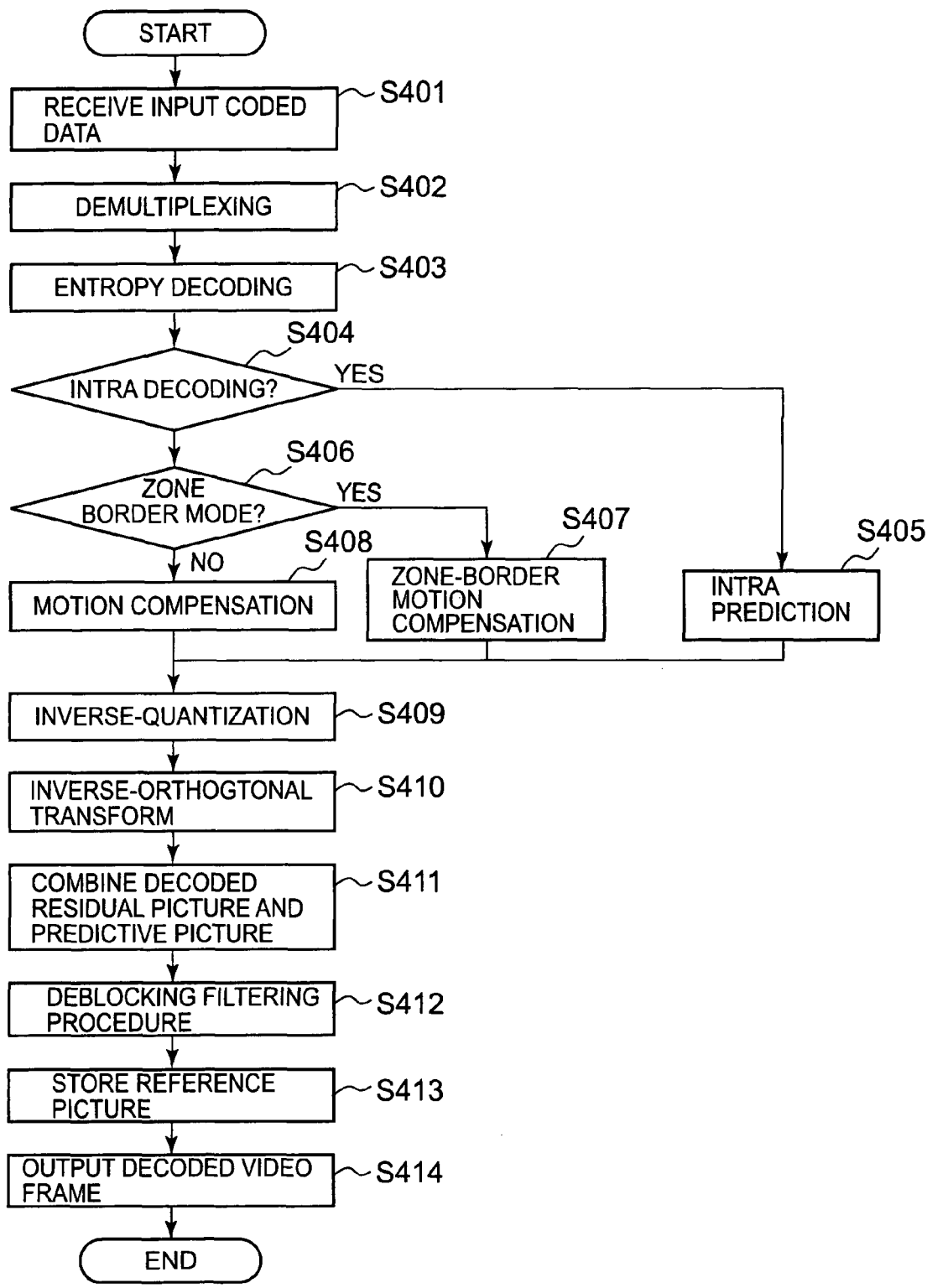
FIG. 8 is a flowchart for explaining an operation of the second embodiment of the moving-picture decoding apparatus according to the present invention.

Disclosed next with reference to FIGS. 7 and 8 is the second embodiment of the moving-picture decoding apparatus that receives and decodes a coded bitstream generated by the second embodiment of the moving-picture coding apparatus of the present invention or a computer that runs on a second coding program that achieves this embodiment of the moving-picture coding apparatus with software which will be described later.

FIG. 7 shows a block diagram of the second embodiment of the moving-picture decoding apparatus according to the present invention. In the figure, the component parts analogous to those in FIG. 3 are given the same reference numerals, with detailed explanation thereof being omitted. In addition to the component parts analogous to those of the moving-picture decoding apparatus of FIG. 3, the moving-picture decoding apparatus in this embodiment is equipped a switch 701 and a motion compensator 702.

The switch 701 switches a picture between a first predictive picture sent to a terminal "b" from the zone-border motion compensator 314 and a second predictive picture sent to a terminal "a" from a motion compensator 702, in response to an instruction from a decoding controller 313a, to supply the selected predictive picture to the terminal "b" of a switch 302.

The motion compensator 702 receives motion-vector data from an entropy decoder 305a and the corresponding reference picture from the frame memory 311 and finds out the corresponding block in the reference picture based on the motion-vector data, thus producing a second predictive picture which is then supplied to the terminal "a" of a switch 701.

The switch 302 receives a fourth predictive picture, at the terminal "a", produced by the intra predictor 308 and a first or a second predictive picture, at the terminal "b", selected by the switch 701. The switch 302 performs switching control to the predictive pictures, in response to an instruction from a decoding controller 313a, to supply the selected predictive picture to the first combiner 309.

The entropy decoder 305a performs entropy encoding to a received bit string to obtain motion-vector data and residual determination data, in addition to the functions of the entropy decoder 305 in FIG. 3. The obtained motion-vector data and residual determination data are supplied to the motion compensator 702 and the decoding controller 313a, respectively.

The decoding controller 313a receives the residual determination data from the entropy decoder 305a to examine, from the residual determination data, which of the first or the second predictive picture was used in residual-picture production, thus selected by the switch 701 based on the examination result.

When the decoding controller 313a finds out that the predictive picture used in residual-picture production was the first predictive picture, from the residual determination data, it turns the switch 701 to the terminal "b".

In contrast, when the decoding controller 313a finds out that the predictive picture used in residual-picture production was the second predictive picture, from the residual determination data, it turns the switch 701 to the terminal "a", to supply the selected predictive picture to the terminal "b" of the switch 302.

Moreover, the decoding controller 313a selects the terminal of the switch 302 according to a decoding mode. If the decoding mode is intra decoding mode, the decoding controller 313a turns the switch 302 to the terminal "a", otherwise it turns the switch 302 to the terminal "b".

In FIG. 7, a zone-border motion compensator 314 supplies a produced first predictive picture to the terminal "b" of the switch 701 whereas, in FIG. 3, the counterpart supplies it to the terminal "b" of the switch 302.

Disclosed next with reference to a flowchart in FIG. 8 is an operation of the second embodiment of the moving-picture decoding apparatus in FIG. 7.

The input receiver 303 receives coded data by sequentially receiving specific packet data as the input signal 301 via a transfer line or a storage medium (step S401). Moreover, the input receiver 303 performs a packet combining procedure to the packet data to reconstruct a coded bitstream which is then supplied to the demultiplexer 304.

The demultiplexer 304 performs demultiplexing of the coded data from the coded bitstream based on a specific syntactic structure (step S402), and supplies coded bit strings, post-demultiplexed data, to the entropy decoder 305a.

The entropy decoder 305a performs entropy decoding to the coded bit strings received from the demultiplexer 304 (step S403) to obtain post-quantization data, border motion-vector data, motion-vector data, residual determination data, and other parameter data, for example, required for constructing a specific syntactic structure. Then, the entropy decoder 305a supplies at least the post-quantization data, the border motion-vector data, the motion-vector data, and the residual determination data to the inverse-quantizer 306, the zone-border motion compensator 314, the motion compensator 702, and the decoding controller 313a, respectively.

The decoding controller 313a then determines whether the current decoding mode in the decoding apparatus is intra decoding or not (step S404).

If intra decoding (YES in step S404), the decoding controller 313a supplies the parameter data required for intra decoding to the respective component parts of the decoding apparatus, and turns the switch 302 to the terminal "a" for intra decoding, which is followed by intra prediction at the intra predictor 308 (step S405). Then, the procedure moves to step S409.

On the contrary, if not intra decoding (NO in step S404), the decoding controller 313a supplies the parameter data required for inter decoding to the respective component parts of the decoding apparatus, and turns the switch 302 to the terminal "b" for inter decoding.

Moreover, if not intra decoding (NO in step S404), the decoding controller 313a determines as to whether it is a zone border mode for zone-border motion compensation, based on the residual determination data received from the entropy decoder 305a (step S406).

If it is the zone border mode (YES in step S406), the decoding controller 313a turns the switch 701 to the terminal "b" in order to select the first predictive picture to be produced by the zone-border motion compensator 314. Then, the zone-border motion compensator 314 performs zone-border motion compensation based on the zone-border motion-vector data received from the entropy decoder 305a and the corresponding reference picture received from the frame memory 311 (step S407). The first predictive picture thus produced is then supplied to the terminal "b" of the switch 701. Then, the procedure moves to step S409.

If it is not the zone border mode (NO in step S406), the decoding controller 313a turns the switch 701 to the terminal "a" in order to select the second predictive picture to be produced by the motion compensator 702. Then, the zone-border motion compensator 314 performs zone-border motion compensation based on the motion-vector data received from the entropy decoder 305a and the corresponding reference picture received from the frame memory 311 (step S408). The second predictive picture thus produced is then supplied to the terminal "a" of the switch 701. Then, the procedure moves to step S409.

When the predictive picture is given, the inverse-quantizer 306 receives the post-quantization data from the entropy decoder 305a and performs inverse-quantization to the data based on a specific quantization parameter (step S409). Post-inverse-quantization data thus generated are then supplied to the inverse-orthogonal transformer 307. The inverse-orthogonal transformer 307 performs inverse-orthogonal transform to the post-inverse-quantization data (step S410). A decoded residual picture thus produced is supplied to the first combiner 309.

The first combiner 309 combines the decoded residual picture received from the inverse-orthogonal transformer 307 and the predictive picture received from the switch 302 (step S411) to produce a decoded picture which is then supplied to the deblocking filter 310. The decoded picture is also supplied to the intra predictor 308 when the decoding mode is intra decoding.

The deblocking filter 310 receives the decoded picture from the first combiner 309 and performs a deblocking filtering procedure (step S412). A deblocking-filtered decoded picture is then stored in the frame memory 311 as a reference picture for the succeeding coding (step S413).

The frame memory 311 receives and stores the deblocking-filtered decoded picture received from the deblocking filter 310, as a reference picture, and supplies the reference picture to the zone-border motion compensator 314, the motion compensator 702 and the intra predictor 308, in need.

It is preferable for the frame memory 311 to store at least one or more of reference pictures and supply a required reference picture to any component parts of the decoding apparatus. Moreover, the frame memory 311 outputs a decoded video frame at display timing for a decoded picture (step S414). The decoded video frame is output to an external display apparatus (not shown) as an output signal 312 necessary for displaying.

Thereafter, if there is another coded bitstream to be decoded and decoding is necessary, the procedure returns to step S401 to continue the decoding procedure whereas if decoding is not necessary, the decoding procedure is finished.

Accordingly, in the moving-picture decoding apparatus and method of the second embodiment, decoding is performed after the zone-border motion compensator 314 or the motion compensator 702 performs zone-border motion compensation or ordinary motion compensation to the input signal that is a coded bitstream subjected to the zone-border motion estimation and zone-border motion compensation or ordinary motion compensation and estimation, discussed above, with coding parameters, border motion-vector data, and residual determination data indicating whether the selected residual signal is based on a predictive signal subjected to zone-border motion compensation or ordinary motion compensation. Therefore, the moving-picture decoding apparatus and method of the second embodiment can correctly decode a bitstream coded through zone-border motion compensation or ordinary motion compensation which are adaptively switched based on the data amount, thus producing high-quality decoded videos with a fewer code amount overall.

Embodiment III

The present invention is not limited to the above embodiment I or II, but also includes programs that achieve the functions of the coding apparatus in FIG. 1 or FIG. 5, and the functions of the decoding apparatus in FIG. 3 or FIG. 7, on a central processing apparatus that is a computer shown in FIGS. 9 to 12, the programs being described as follows.

Figure 9:
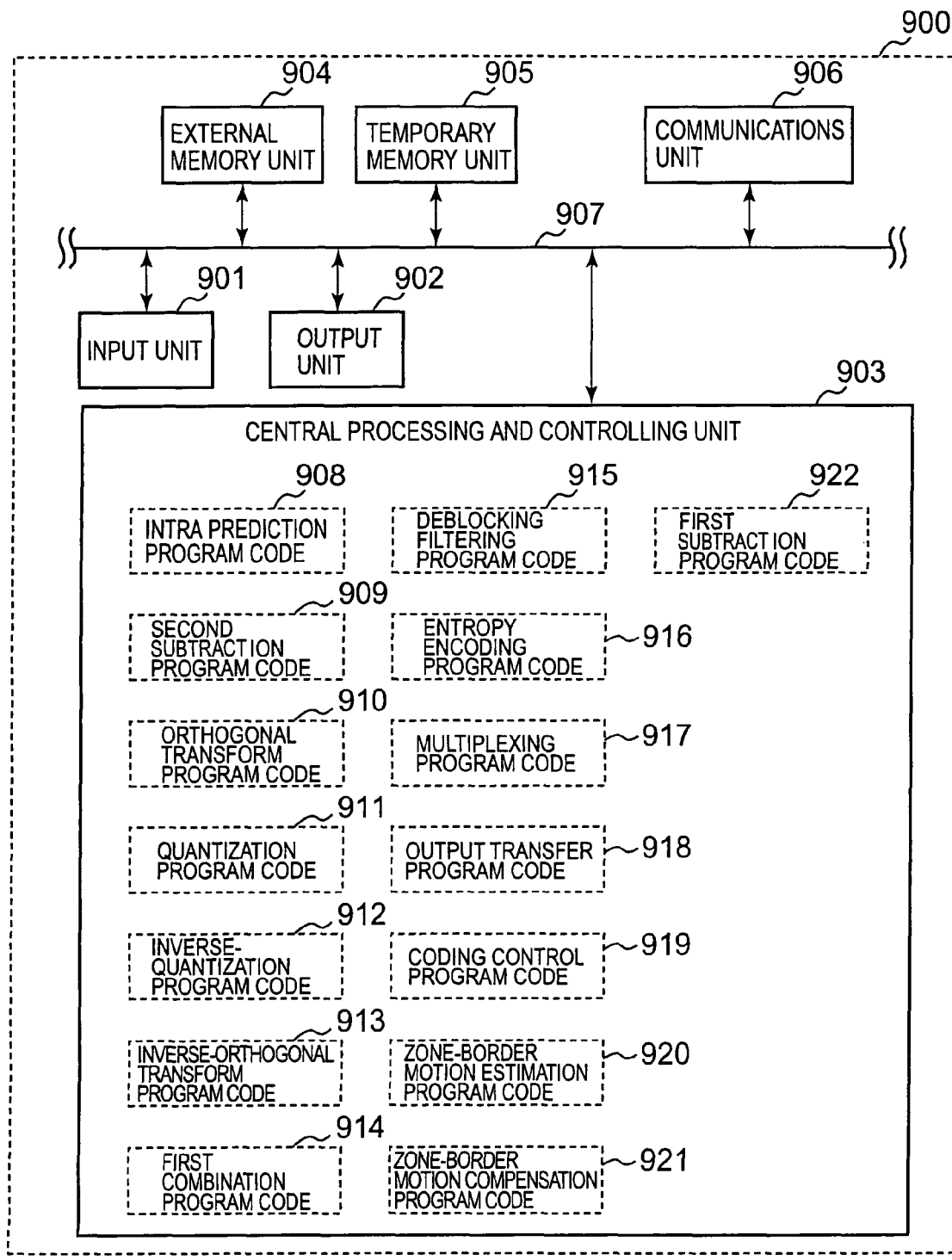
FIG. 9 is a block diagram of a data processing system operated with a first embodiment of a moving-picture coding program according to the present invention.

FIG. 9 is a block diagram of a data processing system operated with a first embodiment of a moving-picture coding program according to the present invention. The data processing system 900 is equipped with: an input unit 901 for entering several kinds of data; an output unit 902 for outputting several kinds of data; a central processing and controlling unit 903 that runs on the first embodiment of the moving-picture coding program according to the present invention; an external memory unit 904; a temporary memory unit 905 to be used, for example, as a working area in processing at the central processing and controlling unit 903; and a communications unit 906 for external communications. The units are connected to one another via a bidirectional bus 907.

Installed in the central processing and controlling unit 903 from a storage medium or via a communications network (not shown) through the communications unit 906 is the first embodiment of the moving-picture coding program that executes the same functions as the coding apparatus shown in FIG. 1.

The first embodiment of the moving-picture coding program includes, at least, an intra prediction program code 908, a second subtraction program code 909, an orthogonal transform program code 910, a quantization program code 911, an inverse-quantization program code 912, an inverse-orthogonal transform program code 913, a first combination program code 914, a deblocking filtering program code 915, an entropy encoding program code 916, a multiplexing program code 917, an output transfer program code 918, a coding control program code 919, a zone-border motion estimation program code 920, a zone-border motion compensation program code 921, and a first subtraction program code 922. The program codes except the multiplexing program code 917, the output transfer program code 918, the coding control program code 919, the zone-border motion estimation program code 920, and the zone-border motion compensation program code 921, are referred to as a predictive coding program code.

The program codes 908, 909, 910, 911, 912, 913, 914, 915, 916, 917, 918, 919, 920, 921, and 922 correspond to the intra predictor 105, the second subtractor 106, the orthogonal transformer 107, the quantizer 108, the inverse-quantizer 109, the inverse-orthogonal transformer 110, the first combiner 111, the deblocking filter 112, the entropy encoder 113, the multiplexer 114, the output transferer 115, the coding controller 117, the zone-border motion estimator 118, the zone-border motion compensator 119, and the first subtractor 120, respectively, shown in FIG. 1.

Figure 10:
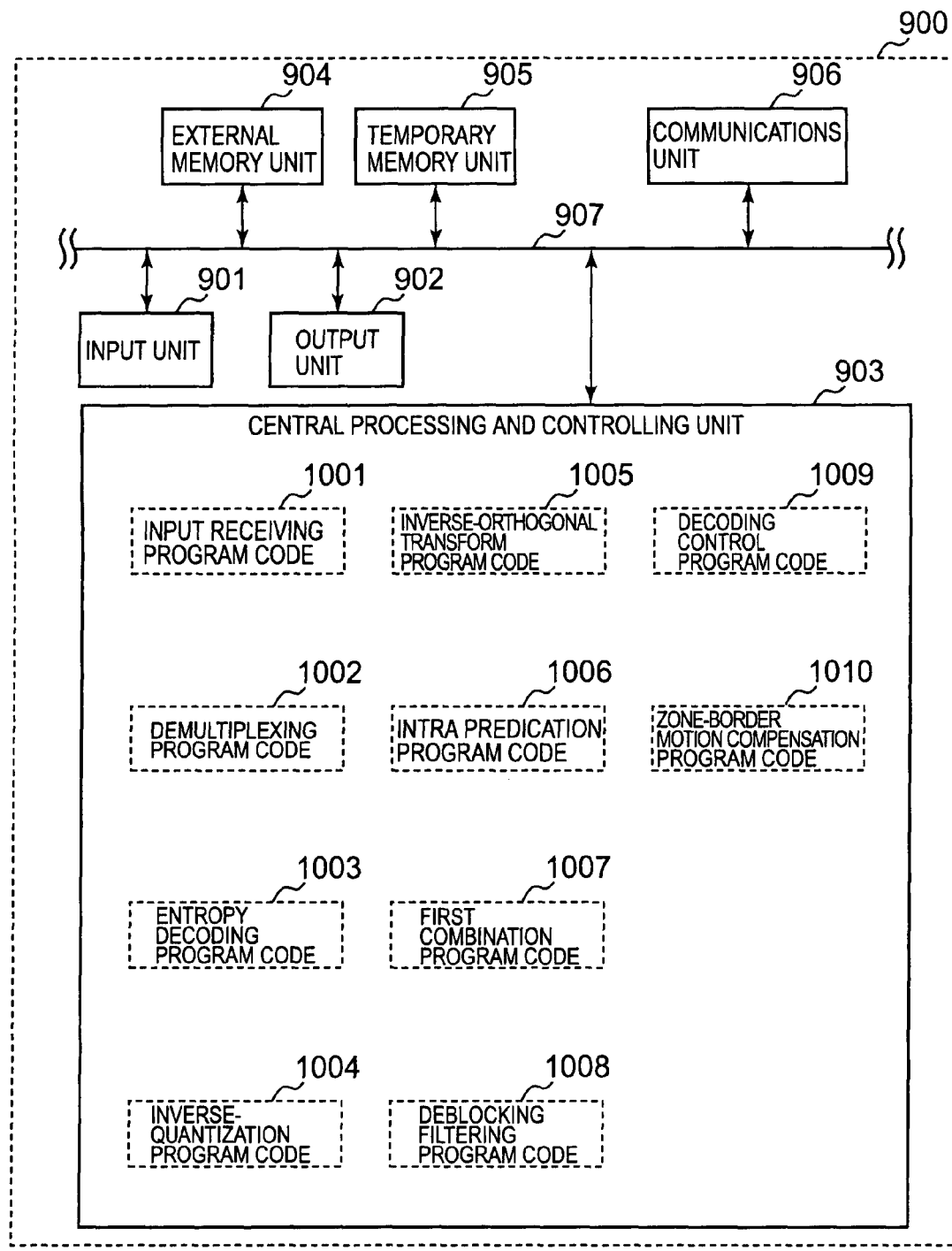
FIG. 10 is a block diagram of a data processing system operated with a first embodiment of a moving-picture decoding program according to the present invention.

FIG. 10 is a block diagram of a data processing system operated with a first embodiment of a moving-picture decoding program according to the present invention. In the figure, the basic structure of each unit included in the data processing system 900 is the same as that in FIG. 9, and hence the explanation thereof is omitted.

Installed in a central processing and controlling unit 903 from a storage medium or via a communications network (not shown) through the communications unit 906 is the first embodiment of the moving-picture decoding program that executes the same functions as the decoding apparatus shown in FIG. 3.

The first embodiment of the moving-picture decoding program includes, at least, an input receiving program code 1001, a demultiplexing program code 1002, an entropy decoding program code 1003, an inverse-quantization program code 1004, an inverse-orthogonal transform program code 1005, an intra prediction program code 1006, a first combination program code 1007, a deblocking filtering program code 1008, a decoding control program code 1009, and a zone-border motion compensation program code 1010.

The program codes 1001, 1002, 1003, 1004, 1005, 1006, 1007, 1008, 1009, and 1010 correspond to the input receiver 303, the demultiplexer 304, the entropy decoder 305, the inverse-quantizer 306, the inverse-orthogonal transformer 307, the intra predictor 308, the first combiner 309, the deblocking filter 310, the decoding controller 313, and the zone-border motion compensator 314, respectively, shown in FIG. 3.

Figure 11:
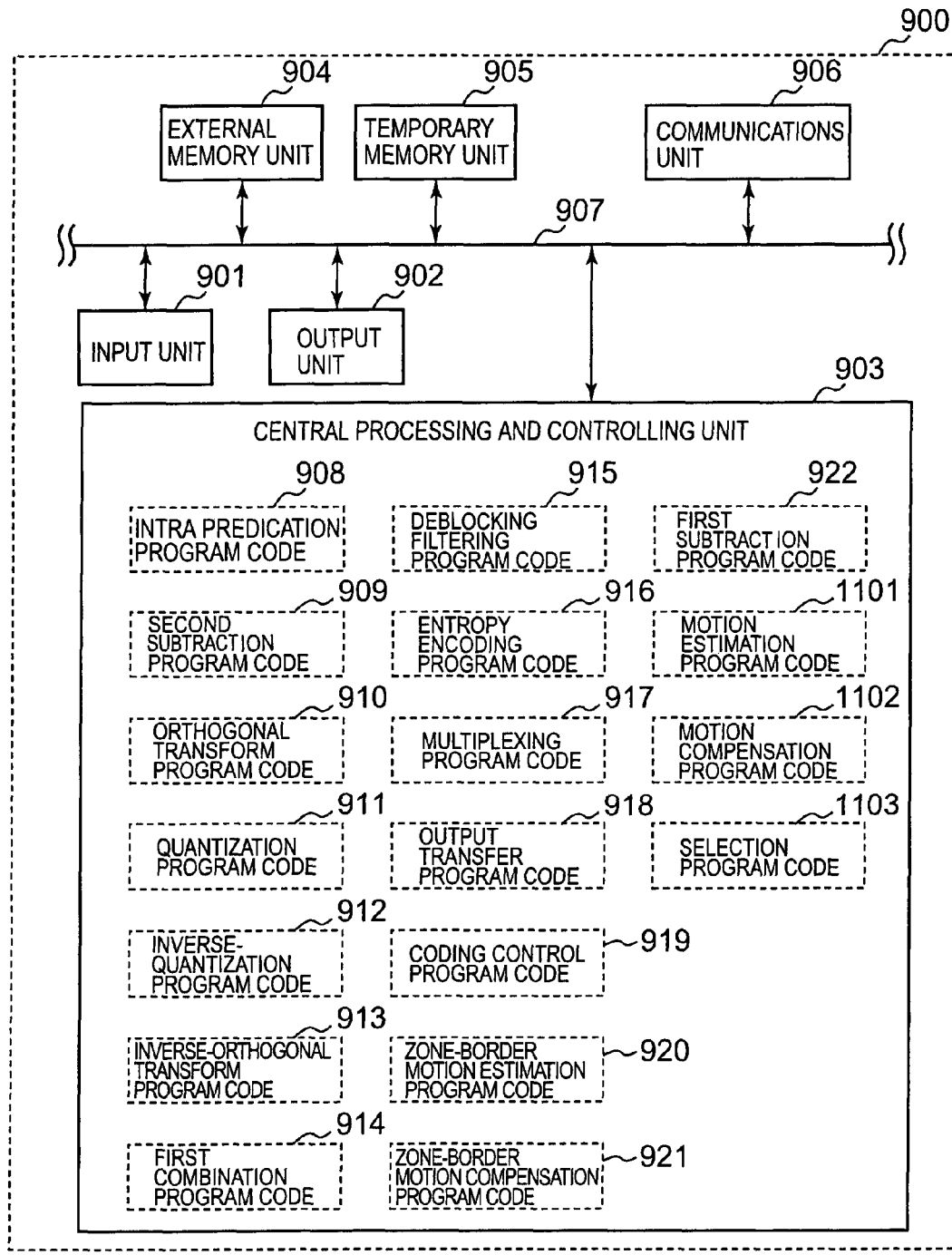
FIG. 11 is a block diagram of a data processing system operated with a second embodiment of a moving-picture coding program according to the present invention.

FIG. 11 is a block diagram of a data processing system operated with a second embodiment of a moving-picture coding program according to the present invention. In the figure, the basic structure of each unit included in the data processing system 900 is the same as that in FIG. 9, and hence the explanation thereof is omitted.

Installed in a central processing and controlling unit 903 from a storage medium or via a communications network (not shown) through the communications unit 906 is the second embodiment of the moving-picture coding program that executes the same functions as the coding apparatus shown in FIG. 5.

In addition to the program codes analogous to those of the first embodiment of the moving-picture coding program in FIG. 9, the second embodiment of the moving-picture coding program includes, at least, a motion estimation program code 1101, a motion compensation program code 1102, and a selection program code 1103. The program codes 1101, 1102, and 1103 correspond to the motion estimator 502, the motion compensator 503, and the residual determiner 504, respectively, shown in FIG. 5.

Figure 12:
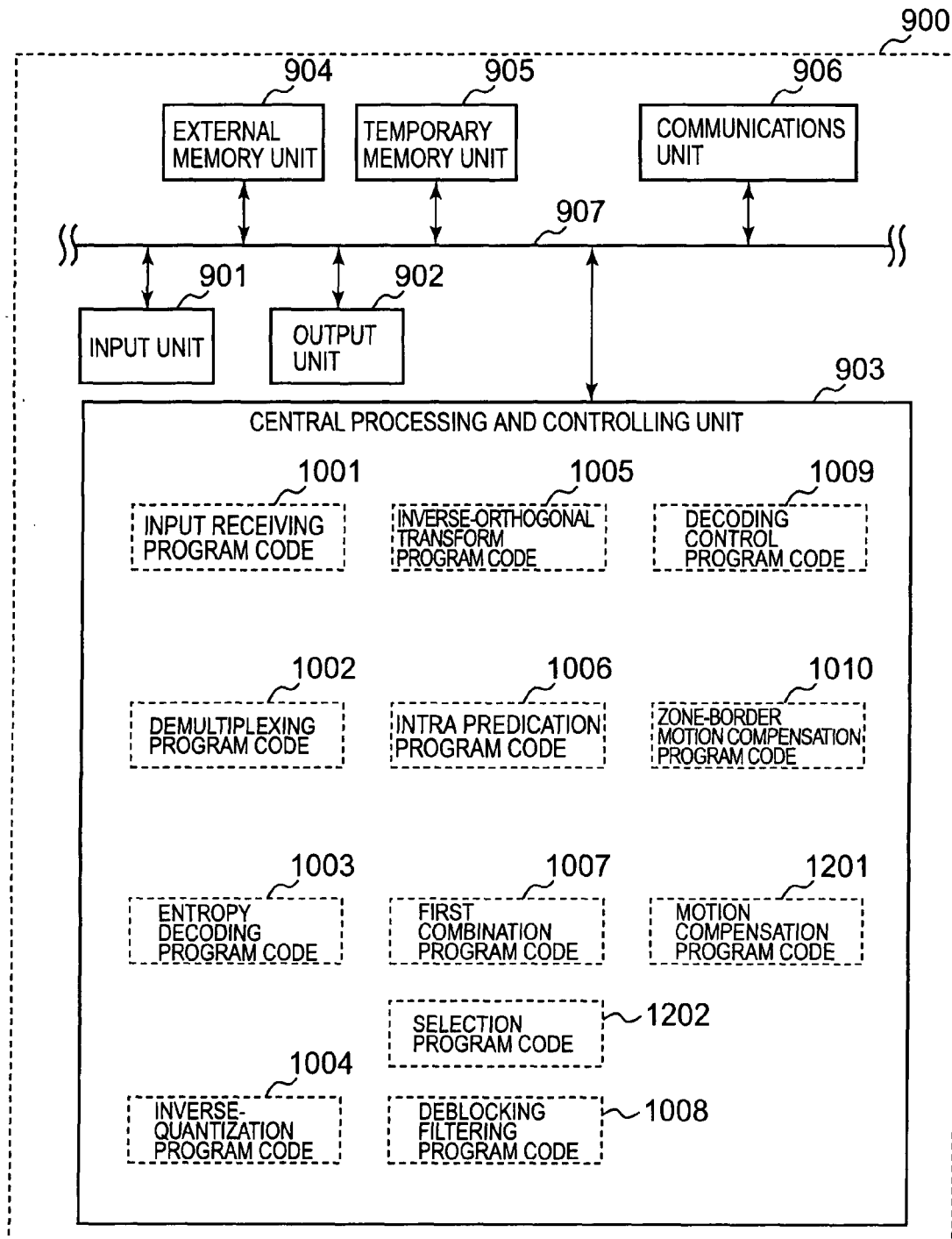
FIG. 12 is a block diagram of a data processing system operated with a second embodiment of a moving-picture decoding program according to the present invention.

FIG. 12 is a block diagram of a data processing system operated with a second embodiment of a moving-picture decoding program according to the present invention. In the figure, the basic structure of each unit included in the data processing system 900 is the same as that in FIG. 10, and hence the explanation thereof is omitted.

Installed in a central processing and controlling unit 903 from a storage medium or via a communications network (not shown) through the communications unit 906 is the second embodiment of the moving-picture decoding program that executes the same functions as the coding apparatus shown in FIG. 7.

In addition to the program codes analogous to those of the first embodiment of the moving-picture decoding program in FIG. 10, the second embodiment of the moving-picture decoding program includes, at least, a motion compensation program code 1201 and a selection program code 1202. The program codes 1201 and 1202 correspond to the motion compensator 702 and the switches 701 and 302, respectively, shown in FIG. 7.

The above embodiments are described based on the H.264/AVC-coding and decoding type or apparatus and the methods and programs thereof, executing intra prediction, deblocking filtering, etc. Not only to that, the present invention is applicable to other coding and decoding types or apparatuses with no intra prediction, deblocking filtering, etc, such as MPEG-1, MPEG-2 or MPEG-4, as long as these are implemented with per-block motion estimation and compensation and equipped with the zone-border motion estimator 118 and the zone-border motion compensator 119, etc., as implemented in the first and second embodiments.

As disclosed above in detail, according to the present invention, each boundary condition is obtained for each border between a rectangular zone to be subjected to prediction in a picture to be coded and other rectangular zones adjacent to that rectangular zone, by finding a border, in a reference picture, having a boundary condition that matches the boundary condition by motion-vector search, defining a boundary condition of a border in the reference picture that corresponds to the border of the rectangular zone in the picture to be coded based on border motion-vector data that is data on motion vector from the border of the rectangular zone in the picture to be coded to a specific border in the reference picture, and producing the first predictive picture based on an estimated video signal, in each rectangular zone in the picture to be coded, that satisfies Poisson's Equation, in zone-border motion compensation. Therefore, according to the present invention, a predictive picture can be produced that maintains continuity of a video signal included in the predictive picture even on a block border, with no discontinuous state between blocks which appears in typical motion estimation and compensation.

Moreover, according to the present invention, production of a predictive picture including a video signal that maintains continuity with no discontinuous state between rectangular zones prevents the quality of a residual picture produced by a difference between the predictive picture and a picture to be coded from being affected by motion estimation and compensation, thus enhancing efficiency of orthogonal transform and quantization of the residual picture.

Moreover, according to the present invention, switching is conducted appropriately between the first and second residual pictures according to the generated data amount so that a residual picture of a smaller data amount is subjected to later-stage orthogonal transform, the first residual picture being a residual signal between the first predictive picture produced by zone-border motion compensation and a picture to be coded and the second residual picture being a residual signal between the second predictive picture produced by typical motion compensation and the picture to be coded. Therefore, the present invention achieves enhancement of coding efficiency for overall coded bitstream.

Moreover, according to the present invention, a coded bitstream thus obtained by coding as described above is received via a transfer line or storage medium for entropy decoding to generate, at least, post-quantization data, zone-border motion-vector data and parameter data required for constructing a specific syntactic structure, defining a boundary condition of a border, in a reference picture, corresponding to and based on the decoded zone-border motion-vector data, an estimated video signal is generated in each rectangular zone in a picture to be coded, that satisfies Poisson's Equation, based on the defined boundary condition, thus producing a predictive picture, and the predictive picture is combined with a decoded residual picture. Therefore, the present invention achieves efficient transfer, reception and reproduction of a coded bitstream with a smaller code amount than known art.

What is claimed is:

1. A moving-picture coding apparatus comprising:
  a predictive encoder to produce and encode a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided;
  a zone-border motion estimator to obtain a boundary condition of each of a plurality of borders between the rectangular zones and another plurality of rectangular zones adjacent to the rectangular zones, find a border, of the reference picture, having a boundary condition that matches the boundary condition, by motion-vector search in the reference picture, and generate border motion-vector data that is data on a motion vector from a border of the rectangular zone in the picture to be coded to the border of the reference picture thus found; and
  a zone-border motion compensator to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture,
  wherein the predictive encoder produces the residual picture with the first predictive picture as the predictive picture and encodes the residual picture;
  said predictive encoder including a first subtractor to produce a first residual picture from a difference between the picture to be coded and the first predictive picture;
  an orthogonal transformer to perform orthogonal transform to the first residual picture, thus generating orthogonal-transform coefficients data;
  a quantizer to perform quantization to the orthogonal-transform coefficients data based on a specific quantization parameter, thus generating post-quantization data;
  an inverse-quantizer to perform inverse-quantization to the post-quantization data based on a specific quantization parameter, thus generating post-inverse-quantization data; and
  an inverse-orthogonal transformer to perform inverse-orthogonal transform to the post-inverse-quantization data, thus producing a decoded residual picture.

2. The moving-picture coding apparatus according to claim 1 wherein the predictive encoder further includes:
  a motion estimator to perform motion-vector search in the reference picture by block matching for each rectangular zone in the picture to be coded, thus generating motion-vector data that indicates a matched rectangular zone in the reference picture;
  a motion compensator to find a corresponding rectangular zone in the reference picture based on the motion-vector data, thus producing a second predictive picture;
  a second subtractor to produce a second residual picture that is a difference between the second predictive picture and the picture to be coded; and
  a residual determiner to compare the first predictive picture and the second predictive picture based on specific criteria, thus selecting the predictive picture having a smaller data amount.

3. The moving-picture coding apparatus according to claim 1 wherein the predictive encoder includes an entropy encoder to perform entropy encoding, at least, to the post-quantization data and the border motion-vector data, thus generating coded bitstreames, wherein the moving-picture coding apparatus comprises a multiplexer to multiplex the coded bitstreames based on a specific syntax structure.

4. A non-transitory computer readable device having stored thereon a computer program comprising a set of instructions when executed by a computer to implement a method for moving-picture coding, the program comprising:
  a predictive encoding program code to produce and encode a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided;
  a zone-border motion estimation program code to obtain a boundary condition of each of a plurality of borders between the rectangular zones and another plurality of rectangular zones adjacent to the rectangular zones, find a border, of the reference picture, having a boundary condition that matches the boundary condition, by motion-vector search in the reference picture, and generate border motion-vector data that is data on a motion vector from a border of the rectangular zone in the picture to be coded to the border of the reference picture thus found; and
  a zone-border motion compensation program code to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture, wherein the predictive encoding program code produces the residual picture with the first predictive picture as the predictive picture and encodes the residual picture;

said predictive encoding program code including a first subtraction program code to produce a first residual picture from a difference between the picture to be coded and the first predictive picture;

an orthogonal transform program code to perform orthogonal transform to the first residual picture, thus generating orthogonal-transform coefficients data;

a quantization program code to perform quantization to the orthogonal-transform coefficients data based on a specific quantization parameter, thus generating post-quantization data;

an inverse-quantization program code to perform inverse-quantization to the post-quantization data based on a specific quantization parameter, thus generating post-inverse-quantization data;

an inverse-orthogonal transform program code to perform inverse-orthogonal transform to the post-inverse-quantization data, thus producing a decoded residual picture; and an entropy coding program code to perform entropy coding, at least, to the post-quantization data and the border motion-vector data, thus generating coded bit strings, wherein the moving-picture coding program further comprises multiplex program code to multiplex the coded bit strings based on a specific syntax structure, thus generating a coded bitstream.

5. The moving-picture coding program code according to claim 4 wherein the predictive encoding program code further includes:

a motion estimation program code to perform motion-vector search in the reference picture by block matching for each rectangular zone in the picture to be coded, thus generating motion-vector data that indicates a matched rectangular zone in the reference picture;

a motion compensation program code to find a corresponding rectangular zone in the reference picture based on the motion-vector data, thus producing a second predictive picture;

a second subtraction program code to produce a second residual picture that is a difference between the second predictive picture and the picture to be coded; and a selection program code to compare the first predictive picture and the second predictive picture based on specific criteria, thus selecting the predictive picture having a smaller data amount, wherein the moving-picture coding program code further comprises a coding control program code to perform control to supply the selected residual picture and a predictive picture corresponding to the residual picture to the predictive encoding program code.

6. A moving-picture decoding apparatus comprising:

a demultiplexer to demultiplex coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture;

an entropy decoder to perform entropy decoding to the data thus demultiplexed to generate, at least, motion-vector data, the post-quantization data, the border motion-vector data and parameter data required for constructing a specific syntax structure;

an inverse-quantizer to perform inverse-quantization to the post-quantization data to generate post-quantization orthogonal transform coefficients data;

an inverse-orthogonal transformer to perform inverse-orthogonal transform to the post-quantization orthogonal transform coefficients data to produce a decoded residual picture of one video area;

a zone-border motion compensator to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture;

a combiner to combine the first predictive picture and the decoded residual picture to generate a decoded moving-picture signal;

a memory to store the decoded moving-picture signal for at least one picture as a reference picture;

a motion compensator to specify a corresponding rectangular zone in the reference picture based on the motion-vector data, thus generating a second predictive picture;

a selector to select either the first predictive picture or the second predictive picture and supply the predictive picture thus selected to the combiner; and a decoding controller to receive decoding control data for decoding control from the parameter data and control the selector to switch the predictive picture to be supplied to the combiner between the first and second predictive pictures according to the decoding control data.

7. A non-transitory computer readable device having stored thereon a computer program comprising a set of instructions when executed by a computer to implement a method for moving-picture decoding, the program comprising:

a demultiplex program code to demultiplex coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture;

an entropy decoding program code to perform entropy decoding to the data thus demultiplexed to generate, at least, the post-quantization data, the border motion-vector data and parameter data required for constructing a specific syntax structure;

an inverse-quantization program code to perform inverse-quantization to the post-quantization data to generate post-quantization orthogonal transform coefficients data;

an inverse-orthogonal transform program code to perform inverse-orthogonal transform to the post-quantization orthogonal transform coefficients data to produce a decoded residual picture of one video area;

a zone-border motion compensation program code to define a boundary condition of a border that corresponds to the border motion vector data, from the reference picture based on the border motion-vector data, and generate an estimated video signal in each rectangular zone in the picture to be coded, that satisfies Poisson's Equation, thus producing a first predictive picture; and a combine program code to combine the first predictive picture and the decoded residual picture to generate a decoded moving-picture signal, the decoded moving-picture signal for at least one picture being stored as a reference picture.

8. The moving-picture decoding program according to claim 7 wherein the entropy decoding program code further generates motion-vector data, the program further comprises:

a motion compensation program code to specify a corresponding rectangular zone in the reference picture based on the motion-vector data, thus generating a second predictive picture;

a selection program code to select either the first predictive picture or the second predictive picture and supply the predictive picture thus selected to the combiner; and a decoding controlling program code to receive decoding control data for decoding control from the parameter data and control the selector to switch the predictive picture to be supplied to the combiner between the first and second predictive pictures according to the decoding control data.

9. A moving-picture coding method to be implemented in a moving-picture coding apparatus comprising the steps of:

producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided;

obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating border motion-vector data that is data on a motion vector from a border of the rectangular zone in the picture to be coded to the border of the reference picture thus found;

defining a boundary condition of a border that corresponds to the border motion vector data, from the reference picture based on the border motion-vector data, and generating an estimated video signal in each rectangular zone in the picture to be coded, that satisfies Poisson's Equation, thus producing a predictive picture;

producing a first residual picture from a difference between the picture to be coded and the predictive picture;

performing orthogonal transform to the first residual picture, thus generating orthogonal-transform coefficients data;

performing quantization to the orthogonal-transform coefficients data based on a specific quantization parameter, thus generating post-quantization data;

performing inverse-quantization to the post-quantization data based on a specific quantization parameter, thus generating post-inverse-quantization data; and performing inverse-orthogonal transform to the post-inverse-quantization data, thus producing a decoded residual picture.

10. A moving-picture decoding method to be implemented in a moving-picture coding apparatus comprising the steps of:

demultipling coded data from an input signal based on a specific syntax structure, the input signal being obtained by multiplexing a coded bitstream obtained by predictive coding, border motion-vector data and post-quantization data obtained by quantization in the predictive coding, the coded bitstream obtained by producing and encoding a residual picture that is a residual signal between a picture to be coded that is an input moving-picture video signal to be subjected to coding and a predictive picture produced from a reference picture that is a local decoded video signal for each of a plurality of rectangular zones, each composed of a specific number of pixels, into which a video area of the moving-picture video signal is divided, obtaining a boundary condition of each of a plurality of borders between the rectangular zones and another plurality of rectangular zones adjacent to the rectangular zones, finding a border, of the reference picture, having a boundary condition that matches the boundary condition, by motion-vector search in the reference picture, and generating the border motion-vector data that is data on a motion vector from a border of the rectangular zone in the picture to be coded to the border of the reference picture thus found, defining a boundary condition of a border that corresponds to the border motion vector data, from the reference picture based on the border motion-vector data, and generating an estimated video signal in each rectangular zone in the picture to be coded, that satisfies Poisson's Equation, thus producing the predictive picture;

performing entropy decoding to the data thus demultiplexed to generate, at least, the post-quantization data, the border motion-vector data and parameter data required for constructing a specific syntax structure;

performing inverse-quantization to the post-quantization data to generate post-quantization orthogonal transform coefficients data;

performing inverse-orthogonal transform to the post-quantization orthogonal transform coefficients data to produce a decoded residual picture of one video area;

defining a boundary condition of a border that corresponds to the border motion vector data, from the reference picture based on the border motion-vector data, and generate an estimated video signal in each rectangular zone in the picture to be coded, that satisfies Poisson's Equation, thus producing a predictive picture;

combining the first predictive picture and the decoded residual picture to generate a decoded moving-picture signal; and storing the decoded moving-picture signal for at least one picture as a reference picture.

* * * * *